United States Patent
Landolsi et al.

(10) Patent No.: US 10,672,199 B2
(45) Date of Patent: Jun. 2, 2020

(54) METHOD FOR MONITORING COMPONENT LIFE

(71) Applicant: Ford Global Technologies, LLC, Dearborn, MI (US)

(72) Inventors: Fakhreddine Landolsi, Canton, MI (US); Pankaj Kumar, Dearborn, MI (US); Imad Hassan Makki, Dearborn Heights, MI (US); Hassene Jammoussi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 15/409,421

(22) Filed: Jan. 18, 2017

(65) Prior Publication Data

US 2018/0204393 A1    Jul. 19, 2018

(51) Int. Cl.
| | |
|---|---|
| G07C 5/00 | (2006.01) |
| G07C 5/08 | (2006.01) |
| B60R 16/023 | (2006.01) |
| F02M 35/10 | (2006.01) |
| B60L 58/10 | (2019.01) |

(Continued)

(52) U.S. Cl.
CPC .............. *G07C 5/006* (2013.01); *B60L 58/10* (2019.02); *B60R 16/0234* (2013.01);
(Continued)

(58) Field of Classification Search
CPC .... F02D 41/18; F02D 41/0037; F02D 41/222; G01R 31/389; G01R 31/392; G01R 31/3648; G01R 31/382; H01M 10/4242; H01M 10/4285; H01M 10/48; B60L 58/16; B60L 2240/549; B60L 2240/80; B60L 2250/16; B60L 58/10; B60L 58/12; H02J 7/0021; Y02T 10/7005; Y02T 10/705; Y02T 10/7055; Y02T 10/7072; Y02T 10/84; B60K 2370/154; B60K 2370/174; B60W 10/26; B60W 2050/146;
(Continued)

(56) References Cited

U.S. PATENT DOCUMENTS

| | | |
|---|---|---|
| 8,676,482 B2 | 3/2014 | Uchida |
| 2003/0184307 A1 | 10/2003 | Kozlowski et al. |

(Continued)

OTHER PUBLICATIONS

Jammoussi, Hassene, et al., "Method for Monitoring Component Life," U.S. Appl. No. 15/409,442, filed Jan. 18, 2017, 72 pages.
(Continued)

*Primary Examiner* — Tuan C To
*Assistant Examiner* — Paul A Castro
(74) *Attorney, Agent, or Firm* — Geoffrey Brumbaugh; McCoy Russell LLP

(57) ABSTRACT

Methods and systems are provided for reliably prognosing a vehicle component, such as a vehicle battery or an intake air filter. A state of degradation of the component is recursively predicted by updating, based on a sensed vehicle operating parameter, a previously estimated state of degradation of the component, the parameter selected based on the component being diagnosed, as well as based on past driving history and future driving predictions. The predicted state of degradation is then converted into an estimate of time or distance remaining before the component needs to serviced, and displayed to the vehicle operator.

20 Claims, 14 Drawing Sheets

(51) Int. Cl.
*F02M 35/02* (2006.01)
*F02M 35/024* (2006.01)
*F02M 35/09* (2006.01)

(52) U.S. Cl.
CPC ........ *F02M 35/021* (2013.01); *F02M 35/024* (2013.01); *F02M 35/09* (2013.01); *F02M 35/1038* (2013.01); *F02M 35/10386* (2013.01); *G07C 5/0808* (2013.01); *G07C 5/0841* (2013.01); *B60L 2260/44* (2013.01); *Y02T 10/7005* (2013.01); *Y02T 10/705* (2013.01)

(58) Field of Classification Search
CPC .. B60W 20/12; B60W 20/15; B60W 2530/14; B60W 2550/402; B60W 50/0097; B60W 50/06; Y10S 903/93
See application file for complete search history.

(56) References Cited

U.S. PATENT DOCUMENTS

2007/0029974 A1* 2/2007 Uchida .............. G01R 31/3842
320/132
2009/0027056 A1* 1/2009 Huang .................... B60L 58/12
324/439
2016/0209472 A1* 7/2016 Chow .................... B60L 58/12

OTHER PUBLICATIONS

Ceraolo, Massimo, "New Dynamical Models of Lead-Acid Batteries," IEEE Transactions on Power Systems, vol. 15, No. 4, Nov. 2000, pp. 1184-1190, 7 pages.

Juang, Larry W., et al., "System Identification-Based Lead-Acid Battery Online Monitoring System for Electric Vehicles," Wisconsin Electric Machines and Power Electronics Consortium, IEEE 2010, pp. 3903-3910, 8 pages.

Moubayed, Nazih, et al., "Parameter Identification of the Lead-Acid Battery Model," IEEE 2008, 6 pages.

Sun, Dong, et al., "Adaptive Parameter Identification Method and State of Charge Estimation of Lithium Ion Battery," 2014 International Conference on Electrical Machines and Systems, Hangzhou, China, IEEE 2014, pp. 855-860, 6 pages.

Jackey, Robyn A., "A Simple, Effective Lead-Acid Battery Modeling Process for Electrical System Component Selection," The MathWorks, Inc., 2007, SAE 2007-01-0778, 9 pages.

* cited by examiner

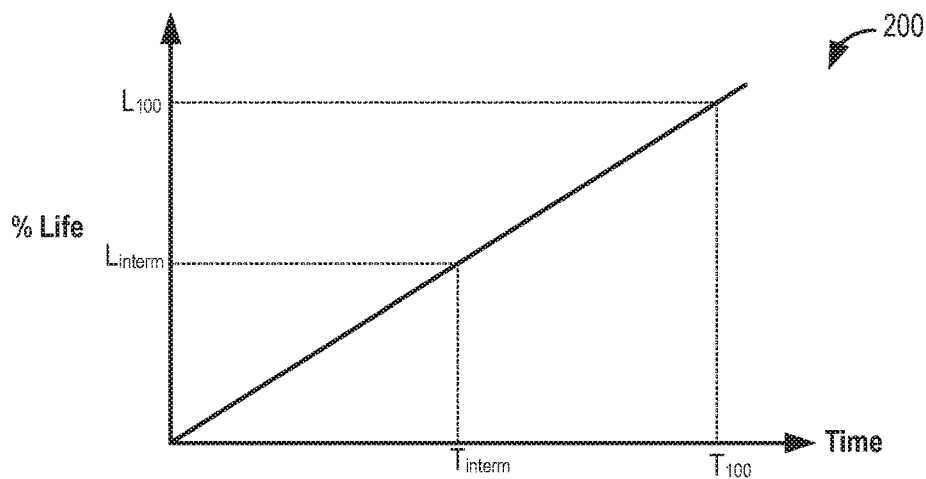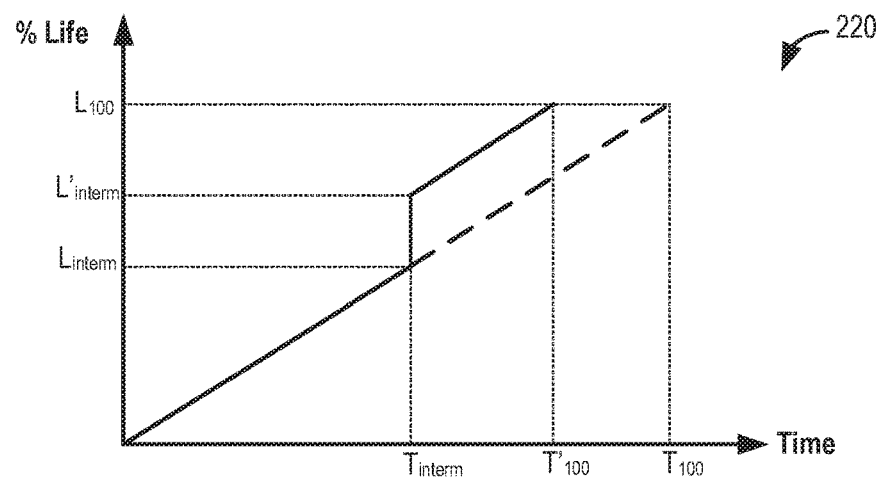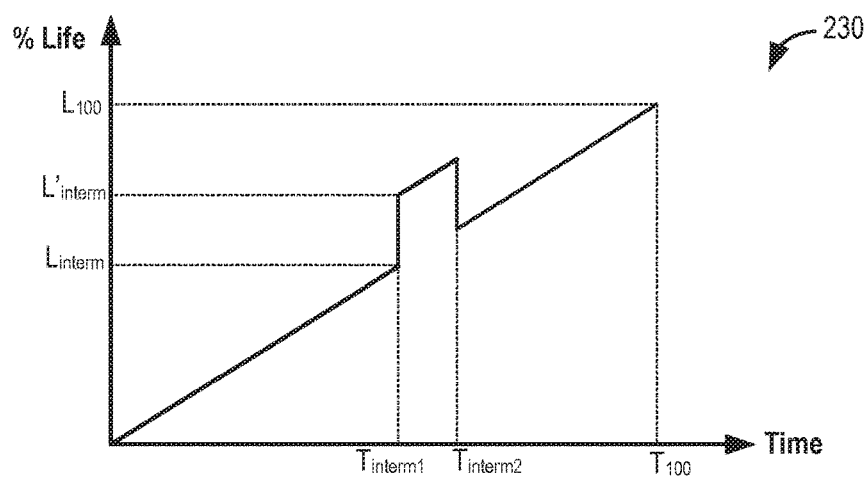
FIG. 2

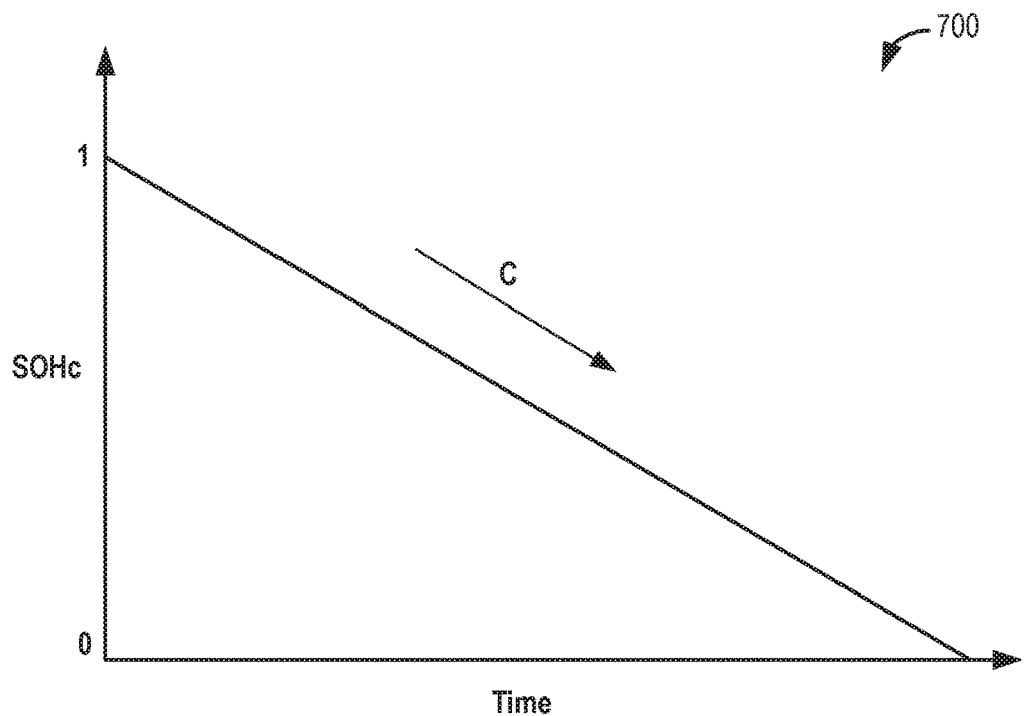
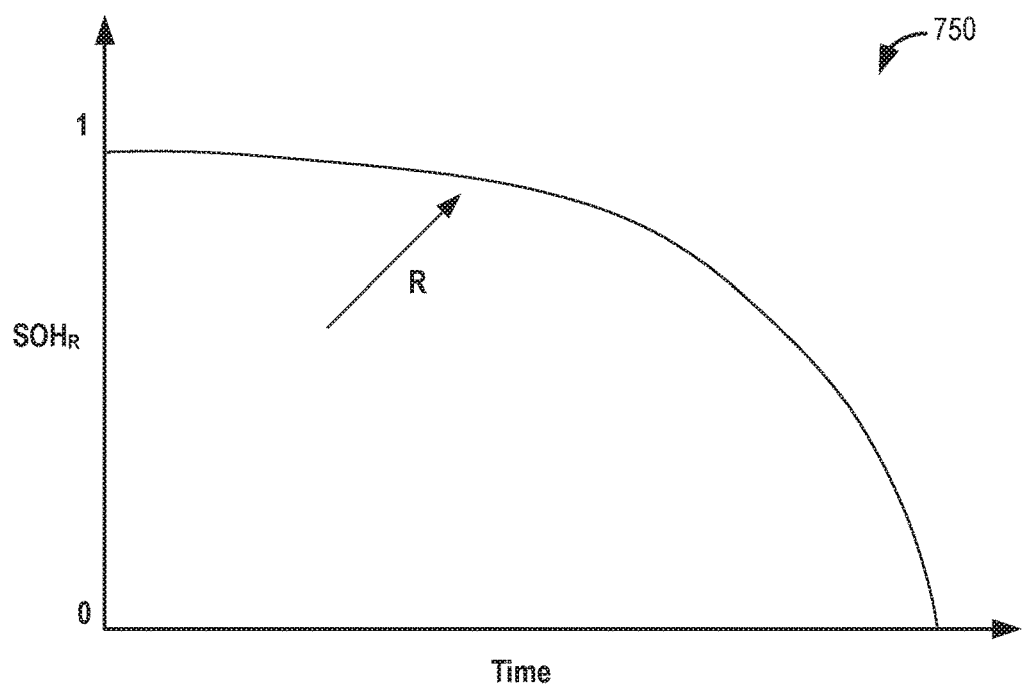
FIG. 7

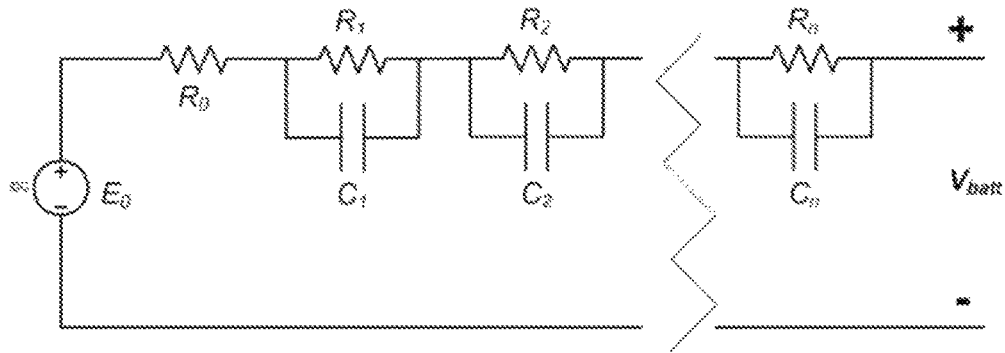

Fig. 13

$$H(z,\theta) = \frac{b_0(\theta) + b_1(\theta)z^{-1}}{1 + a_1(\theta)z^{-1}} \text{ where } \begin{cases} a_1(\theta) = \dfrac{1 - 2R_1(\theta)C_1(\theta)}{1 + 2R_1(\theta)C_1(\theta)} \\ b_0(\theta) = \dfrac{T(R_0(\theta) + R_1(\theta)) + 2R_0(\theta)R_1(\theta)C_1(\theta)}{1 + 2R_1(\theta)C_1(\theta)} \\ b_1(\theta) = \dfrac{T(R_0(\theta) + R_1(\theta)) - 2R_0(\theta)R_1(\theta)C_1(\theta)}{1 + 2R_1(\theta)C_1(\theta)} \end{cases}$$

$$H(z,\theta) = \frac{V(z)}{I(z)} = \frac{b_0(\theta) + b_1(\theta)z^{-1}}{1 + a_1(\theta)z^{-1}} \longrightarrow V(k) = b_0(\theta)I(k) + b_1(\theta)I(k-1) - a_1(\theta)V(k-1)$$

$$V(k) = \Phi x \quad \text{where} \quad \begin{array}{l} x = [b_0(\theta) \; b_1(\theta) \; a_1(\theta)]^T \\ \Phi = [I(k) \; I(k-1) \; V(k-1)] \end{array}$$

Fig. 14

METHOD FOR MONITORING COMPONENT LIFE

FIELD

The present application relates to methods performed in vehicles, such as hybrid vehicles, for estimating the remaining life of a vehicle component using statistical predictions.

BACKGROUND AND SUMMARY

Vehicles include various components which degrade at different rates and have to be serviced at different times. In addition, the degradation rate of each component may be affected by multiple parameters, some of which are overlapping with other components while others are non-overlapping. For example, in hybrid electric vehicles, a system battery may degrade based on the rate of battery usage, the age of the battery, temperature conditions, the nature of the battery, etc. As another example, an air filter coupled to the engine intake may degrade based on the age of the filter, air quality, ambient weather conditions, etc.

Various approaches have been developed to predict the state of health of a vehicle component. One example approach is shown by Uchida in U.S. Pat. No. 8,676,4825. Therein the health of the battery of a hybrid vehicle is predicted based on a decrease in the fuel economy of the vehicle. Another example approach is shown by Kozlowski et al. in US 20030184307. Therein the state of health of a system battery is predicted based on the frequency of battery charging and discharging and its effects on battery parameters such as impedance, electrolyte state, etc. The battery health is then indicated in terms of a number of remaining useful cycles.

However the inventors herein have identified various issues with such approaches. As one example, the above approaches rely on statistical analyses that can be computationally intensive. Consequently, they may require extensive memory and processor resources to assess the health of the battery. As another example, the above approaches require frequent measurements via sensors coupled to the respective components. Reliance on sensors, which themselves are subject to wear and tear, can cause inaccuracy in the state of health estimation. In addition, the approach does not accurately account for the effect of temperature on the internal resistance and capacitance of the battery, as the battery ages. As yet another example, an operator may not be able to comprehend how much battery degradation has occurred when the battery health is indicated in terms of a number of remaining useful cycles. This may be particularly difficult when the battery is part of a hybrid vehicle where the engine automatically meets the driver demand when the battery is not able to. As a result, the vehicle operator may not be able to replace or service the battery before it is fully degraded, compromising vehicle operation. Further, the vehicle operator may not be able to timely modify their driving characteristics to avert battery degradation.

In one example, some of the above issues may be addressed by a method for a vehicle, comprising: predicting a state of degradation of a vehicle component based on a determined metric derived from a sensed vehicle operating parameter, including a past history of the determined metric; converting the predicted state of degradation into a remaining time or duration estimate for display to a vehicle operator based on the past driving history and predicted future driving, including the past history of the determined metric. In this way, the remaining useful life of a vehicle component may be more accurately predicted and the information may be conveyed to the vehicle operator in a more comprehensible manner. In one example, the vehicle component is a system battery.

As an example, a hybrid vehicle system may include a component whose life is predicted using statistical methods. A controller may predict a base rate of degradation of the component based on a past history (e.g., frequency) of servicing of the component. For example the controller may use a linear degradation model to predict a base value of the remaining life of the component. The controller may then update the estimate based on the nature of operation of the vehicle (e.g., the vehicle driving pattern and other driving statistics), the nature of operation of the component (e.g., how often the component was used in the current drive cycle, and responsive to which events), as well as any noise factors or parameters that may alter the base rate of degradation of the given component. As an example, when the component being assessed is a battery, the base rate of degradation may be based on when the battery was last serviced, battery state of charge, as well as temperature conditions. The model may use the measured parameters to estimate a current state of the battery's internal resistance and internal capacitance. The state of health of the battery is then calculated as a function of the estimated internal resistance and internal capacitance, a weightage assigned to the resistance and capacitance values varied based on the nature of the battery (e.g., based on whether the battery is a lead-acid battery or a lithium ion battery, etc.). In addition, the state of health of the battery may be updated based on how aggressively the vehicle was operated and any specific driving maneuvers (e.g., cornering maneuvers) that can rapidly drain the battery. In another example, when the component being assessed is an intake air filter, the base rate of degradation may be based on when the filter was last replaced, and the base rate may be updated based on sensed changes in manifold air flow at different degrees of throttle opening during engine transients, as well as ambient weather conditions that can cause a sudden clogging of the filter (e.g., presence of sudden dust storm or snow storm that can clog the filter). The sensed state of health may then be converted into an estimate of a remaining life of the component, including a time and/or distance of vehicle travel remaining before the component needs to be changed or serviced. The conversion may be based on the sensed state of health of the filter and further based on vehicle drive statistics including a time and/or distance of travel already completed by the vehicle, as well as operator driving patterns and habits. In one example, the remaining life of the battery may be used by the vehicle operator to infer if a hybrid vehicle can be started via the battery or not on a given vehicle start.

In this way, the remaining life of a vehicle component may be accurately predicted without relying on computationally intensive algorithms. By using data sensed on-board the vehicle, in association with vehicle driving statistics, the state of health of a component may be calculated more accurately. For example, the internal resistance and capacitance of a system battery may be better determined by accounting for temperature effects, as well as the effects of aggressive operator driving behavior. As another example, the degree of clogging of an air filter may be more accurately predicted based on a recursive estimation of mean and standard deviation of air flow values at large throttle openings. By assessing an air filter while relying on air flow or manifold pressure data sensed during vehicle transients, a larger portion of data collected over a vehicle drive cycle can be leveraged for filter prognostics. In addition, the need for actively holding the engine in a defined speed-load region, to complete a prognostic or diagnostic routine, is reduced. By converting the sensed state of health into an estimate of a remaining time or duration of vehicle operation before component servicing is required, a vehicle operator may be better notified of the condition of the component. As a result, timely component servicing may be ensured, improving vehicle performance. By predicting the remaining life of a vehicle component via a recursive estimation of statistical features, the remaining life of the component may be predicted with less computation intensity, without compromising on the accuracy of prediction. This enables a margin to be provided that better ensures healthy operation of the component for the estimated remaining life. The prognostics feature may provide an early indication of the remaining life the component to help a customer plan for maintenance ahead of time and avoid component failure. In addition, the convenience of online estimation may be provided in an easy to implement package. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows example percentage life profiles for a vehicle component operating under different conditions.

FIG. 7 shows maps depicting example trends in the state of health of a vehicle battery's capacitance and resistance over time.

FIG. 13 depicts circuitry of an nth order Randel's Model.

FIG. 14 shows a corresponding discrete time transfer function using Tustin's rule.

DETAILED DESCRIPTION

Figure 1:
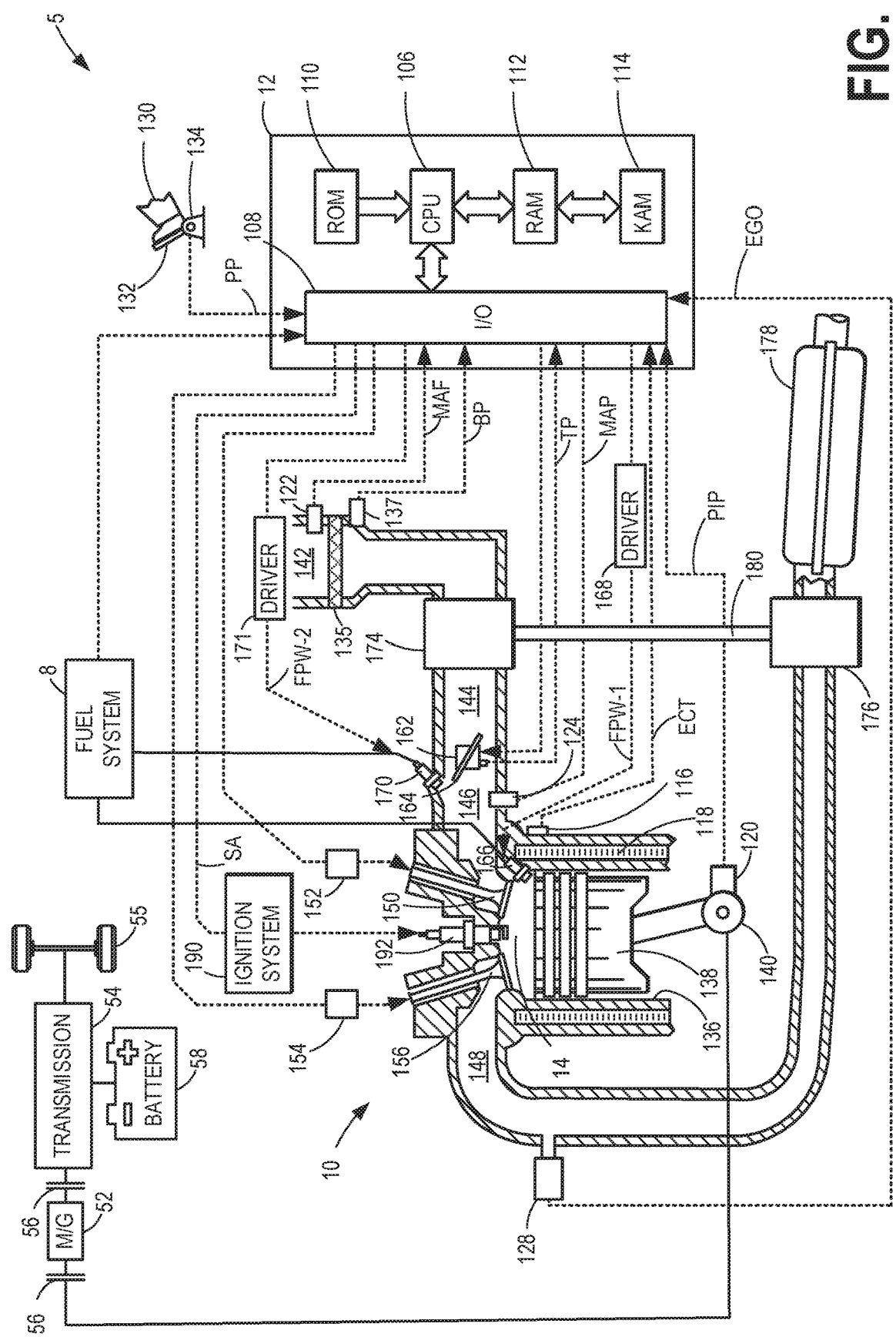
FIG. 1 schematically depicts an example embodiment of a cylinder of an internal combustion engine coupled in a hybrid vehicle system.

The following description relates to systems and methods for predicting the remaining life of a component of a hybrid vehicle system, such as the example vehicle system of FIG. 1. An engine controller may be configured perform a control routine, such as the example routines of FIGS. 3 and 4, to use statistical methods to predict the remaining life of a vehicle component. The controller may take into account the degradation history of the component as well as vehicle driving characteristics to map out percentage life profiles, such as the example profiles of FIG. 2. The controller may then use the percentage life profile to provide the vehicle operator of a remaining time or distance till the component needs to be serviced. Vehicle operations may then adjust in accordance. A routine that predicts the remaining life of a vehicle battery (such as the routine of FIGS. 6-7) may rely on sensed and predicted changes in the resistance and capacitance of the battery, as shown with reference to FIG. 7. A routine that predicts the remaining life of an engine intake air filter (such as the routine of FIG. 8) may rely on sensed changes in manifold air flow with changing throttle position during transient conditions, shown with reference to FIG. 9. The controller may then predict the remaining life of the air filter based on a recursive estimation of the mean value and standard deviation of the sensed manifold air flow, such as shown with reference to FIGS. 10-12. In this way, regular component servicing may be better ensured.

FIG. 1 depicts an example of a combustion chamber or cylinder of internal combustion engine 10. Engine 10 may be coupled in a propulsion system for on-road travel, such as vehicle system 5. In one example, vehicle system 5 may be a hybrid electric vehicle system.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Air received via intake air passage 142 may be filtered via air filter 135 before the air moves into air passages 144, 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; barometric pressure from BP sensor 137; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. For example, based on a pulse-width signal commanded by the controller to a driver coupled to the direct injector, a fuel pulse may be delivered from the direct injector into a corresponding cylinder. Example routines that may be executed by the controller are shown with reference to FIGS. 3-5, and 8.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

The various vehicle components may need to be periodically serviced and diagnosed. In addition, based on their service or degradation history, the remaining life of each component may vary. For example, the controller may intermittently diagnose and recursively estimate a remaining life of the vehicle system battery, the intake air filter. As elaborated with reference to FIGS. 3-5 and 8, a vehicle controller may be configured to use an algorithm to make a statistical prediction regarding the remaining life of the component based on a previous history of degradation behavior of the component, sensed data for parameters relating to the component, as well as based on mapped vehicle driving statistics (such as real-time vehicle driving statistics, or those compiled over a current vehicle drive cycle). The controller may then provide meaningful information regarding the component to the vehicle operator, such as in the form of a distance to service or time to service estimate.

The components of FIG. 1 enable a vehicle system comprising an engine; a motor driven by a battery, sensors for measuring battery voltage and current; and a controller. The controller may be configured with computer-readable instructions stored on non-transitory memory for: predicting a state of degradation of the battery based on determined battery capacitance and resistance derived from sensed battery current or voltage, including a past history of the determined battery resistance and capacitance. The controller may include further instructions for converting the predicted state of degradation into a remaining time or duration estimate for display to a vehicle operator based on past driving history data and predicted future driving, including the past history of the determined metric.

The components of FIG. 1 further enable a vehicle system comprising an engine including an intake passage; an air filter coupled to the intake passage; an intake throttle; a manifold airflow sensor coupled downstream of the intake throttle; and a controller. The controller may be configured with computer-readable instructions stored on non-transitory memory for: storing measured airflow readings when the intake throttle is commanded above a threshold throttle angle; estimating a metric indicative of a spread of manifold airflow based on the stored measured airflow readings; predicting a state of degradation of the air filter based on the estimated metric relative to a threshold; and converting the predicted state of degradation into a remaining time or duration estimate for display to a vehicle operator based on past driving history data and predicted future driving, including a past history of the estimated metric. As an example, the predicting may include predicting a higher state of degradation as the estimated metric falls below the threshold. The metric may be a first metric, and the controller may include further instructions for estimating a second metric indicative of an average manifold airflow through the air filter. In that case, the predicting may include predicting the higher state of degradation as the second metric falls below the threshold. The threshold may be determined as a function of a most recent estimate of the metric retrieved from the past history of the estimated metric, and a distance travelled by the vehicle since the most recent estimate of the estimated metric. Alternatively, the threshold may be determined as a function of an initial estimate of the metric at a time of installation of the air filter, retrieved from the past history of the estimated metric, and a distance travelled by the vehicle since the installation of the air filter. Turning now to FIG. 2, maps 200, 220, and 230 depict example degradation models for a vehicle component. In each case, the x-axis depicts time and the y-axis depicts percentage life with $T_{100}$ representing a time when the component reaches the end of its useful life $L_{100}$.

The degradation behavior of a component is generally assumed to be constant throughout the useful life time interval. For example, assuming a constant degradation behavior, as shown with reference to map 200, a linear degradation model may be determined wherein the remaining life is calculated according to the equation: $L=alpha*T$, wherein alpha is the degradation rate. At an intermediate time ($T_{interm}$) before failure of the component, the component may be prognosed with a percentage life as $L_{interm}$. Herein $T_{interm}$ is the time elapsed between the beginning of life of the component ($L_0$, when the component is first put into function, such as after replacement, after servicing, after being reset, etc.) and the time if prognosis dine in real time. Thus, based on the model, $L_{interm}$ may be determined as: $L_{interm}=alpha*T_{interm}$. The remaining time ($T_1$) till end of life of the component is then determined as:

$$T_{RL}=(T_{100}-T_{interm})=(L_{100}-L_{interm})/alpha$$

Alpha is estimated in real-time based on the degradation of the component (past observation, between $T_0$ and $T_{interm}$).

$L_{100}$ is provided as an input to define the end of life of the component. $L_{interm}$ is then estimated in real-time from the prognostics algorithm.

However, there may be conditions that cause a sudden change in the remaining life of the component due to the nature of operation of the component and the interaction with noise factors. As an example, an intake air filter may clog slowly with a linear degradation rate due to dust accumulation on the filter during driving and engine air suction. However, during vehicle driving through snow, or in the presence of dusty conditions (such as driving in the midst of a dust storm), the air filter may get more clogged in a shorter amount of time, wherein the extra clogging may or may not clear based on the type of accumulation. In such case, the modeling of the remaining life if the constant may still assume a constant degradation rate based on the past statistics, and may adjust the rate in real time based on the real time assessment of the conditions. For example, with reference to map 220, the model may initially assume a constant degradation rate between $T_0$ and $T_{interm}$. At $T_{interm}$, the component may be subject to a drastic change that causes the remaining percent life estimate to be changed from $L_{interm}$ to $L'_{interm}$, wherein $L'_{interm}=L_{interm}$ deltaL. Assuming a constant degradation behavior between $T_0$ and to $T'_{interm}$ as between $T_0$ and $T_{interm}$, and since $L_{interm}=alpha*T_{interm}$, the remaining life is calculated as:

$$T_{RL}=(T_{100}-T_{interm})=(L_{100}-L_{interm}-\text{delta}L)/alpha=(L_{100}-L'_{interm})/alpha$$

It will be appreciated that the drastic change may be positive or negative and the equation may apply to both scenarios.

With reference to map 230, the model may initially assume a constant degradation rate between $T_0$ and $T_{interm1}$. At $T_{interm1}$, a first, positive drastic change may occur that causes the remaining percent life estimate to be changed from $L_{interm}$ to $L'_{interm}$. Between $T_{interm1}$ and $T_{interm}$, a constant rate of degradation may be assumed. At $T_{interm2}$, a second, negative drastic change may occur that causes the remaining percent life estimate to be returned from $L'_{interm}$ to $L_{interm}$. Thereafter, the constant degradation rate may be reassumed until $L_{100}$. As an example of such as a condition, if an air filter was partially clogged due to snow packing, there may be a drastic change in the state of health of the filter, moving the remaining life of the filter up, closer to the end of life of the component. However, when the snow melts, or if the filter is removed, cleaned, and put back in place, there is another drastic change in the state of health of the filter, moving the remaining life of the filter down.

Figure 3:
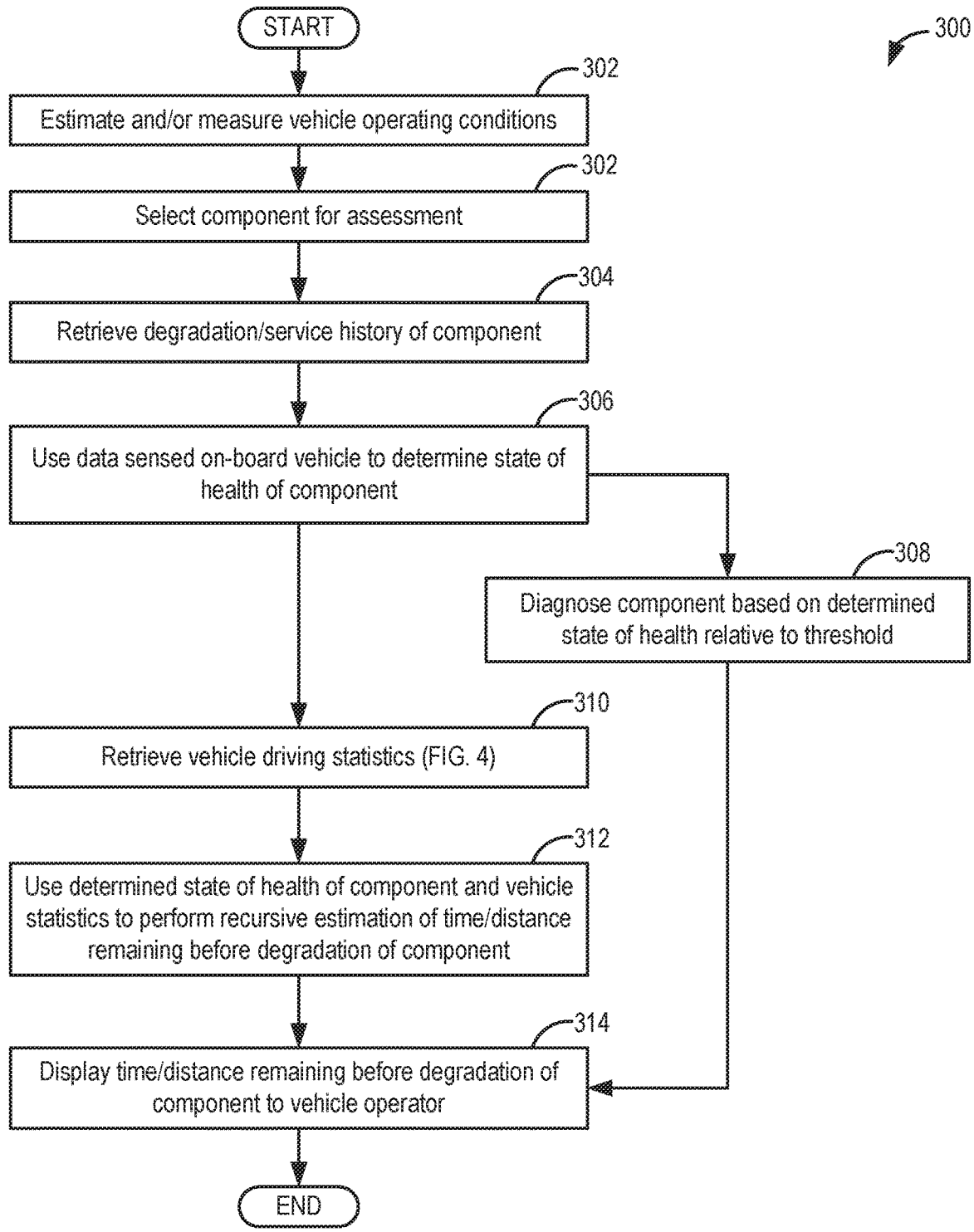
FIG. 3 shows a high level flowchart for performing prognostics and diagnostics of a vehicle component using sensed data and statistical estimations.

Turning now to FIG. 3, an example method 300 is shown for estimating the remaining life of a vehicle component. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ actuators of the vehicle system and engine system to diagnose component state of health, according to the methods described below. The method enables the predicting of a state of degradation of a vehicle component based on a change in value of a metric associated with the vehicle component, from an initial value of the metric at a time of installation in the vehicle system, over a duration of vehicle travel. The predicting is further based on a distance traveled by the vehicle over the duration, the metric derived from a sensed vehicle operating parameter. The method further enables the converting of the predicted state of degradation into an estimate of time or duration remaining before the vehicle component needs to be serviced (or replaced) for display to a vehicle operator, the converting based on each of past driving history data and predicted future driving.

At 302, the method includes estimating and/or measuring vehicle operating conditions. These may include, for example, vehicle speed, engine speed, pedal position, driver torque demand, ambient conditions (such as ambient temperature, pressure, and humidity), boost pressure, battery state of charge, manifold air flow, exhaust air-fuel ratio, transmission gear selection, driving mode (e.g., electric or engine mode; sport, performance or economy mode), etc.

At 303, the method includes selecting a component for assessment. A component may be periodically assessed. Therein the selecting of a component may be based on a time or distance of vehicle travel elapsed since a last assessment of the component. In another example, the selecting may be based on an active request received from the operator. This may be in addition to, or independent of, the periodic assessment. For example, an operator may request prognosis of a system battery before embarking on a planned travel route.

At 304, the method includes retrieving the degradation or service history of the component that is being assessed. This includes retrieving a time or duration elapsed since the component was first installed or operated in the vehicle. Alternatively, this may including retrieving a time or duration elapsed since the component was last serviced, repaired, or reset. In addition, the service history may include details regarding a rate of degradation of the component prior to the most recent service event, a base rate of degradation of the component, an average rate of degradation of the component over the life of the vehicle, and any diagnostic codes associated with the component that were enabled over the life of the vehicle.

At 306, the method includes using data sensed on-board the vehicle to determine the state of health of the component. As elaborated with reference to the examples of FIGS. 5 and 8, this includes sensing one or more parameters associated with the component and comparing the sensed data on a current iteration of the routine to data sensed on a previous iteration of the routine to update the rate of degradation of the component (from a base rate) in real-time. For example, the controller may predict a state of degradation of a vehicle component based on determined metric derived from a sensed vehicle operating parameter, including a past history of the determined metric. In one example, the vehicle component is a system battery, the determined metric is one or more of a battery resistance and a battery capacitance, and the sensed vehicle operating parameter includes one or more of a battery current and a battery voltage. In another example, the vehicle component is an engine intake air filter, and the determined metric is one or more of a mean value and a standard deviation value of air flow through the filter, and the sensed vehicle operating parameter includes manifold air flow. In each case, the sensed vehicle operating parameter is selected based on the vehicle component being prognosed.

From 306, the method proceeds to 308 wherein the component is diagnosed based on the state of health (as determined based on the sensed data) relative to a threshold. For example, if the estimated state of health is determined to be less than a component-specific threshold, the component may be deemed degraded, and the operator may be provided an indication that the component needs to be repaired, serviced, or replaced.

Concurrently, from 306, the method proceeds to 310, wherein vehicle driving statistics are retrieved. The vehicle driving statistics may include, for example, a distance covered over the life of the vehicle (e.g., based on an odometer reading), a number and frequency of service events that have occurred over the life of the vehicle (e.g., how many oil services have occurred, what frequency they were performed, what odometer reading they were performed at), average fuel economy of the vehicle, average speed of the vehicle, average transmission gear usage of the vehicle, average number of miles covered each day, average tire pressure of the vehicle, etc. The vehicle driving statistics may further include, for example, operator specific driving patterns and habits. For example, this may include an operator's preference for fuel economy versus performance, frequency and degree of pedal application and depression (e.g., whether the operator is "lead footed"), how aggressively the operator tends to drive, average speed at which the operator drives, etc. Vehicle driving statistics may further include details regarding weather conditions in which the vehicle is typically driven, such as whether the vehicle is typically operator in rain or snow, dry or humid conditions, etc. The vehicle driving characteristics may reflect driving tendencies of the operator and average conditions experienced by the vehicle component which may affect the base rate of degradation of the component.

At 312, the estimated state of health of the component (based on the sensed data) and the retrieved vehicle driving statistics may be used in combination to perform a recursive estimation of a time or distance remaining before degradation of the component. For example, the estimated state of health of the component may be updated to account for the vehicle driving statistics, and then the updated state of health may be converted into an estimate of time/distance remaining before degradation of the component occurs. In one example, the controller may use an algorithm, such as the example algorithm of FIG. 6, or the example routine of FIG. 8, combined with the algorithm of FIG. 4, to convert the updated state of health into an estimate of time/distance remaining before degradation of the component occurs. For example, the controller may convert the predicted state of degradation into a remaining time or duration estimate for display to a vehicle operator based on past driving history data and predicted future driving, including the past history of the determined metric. In addition, the predicted state of degradation may be converted into a remaining number of fuel tank refilling events for display to the vehicle operator based on the past driving history data and predicted future driving.

At 314, the controller may display the estimated time/distance remaining before degradation of the component to the vehicle operator, such as on a display screen of a central console of the vehicle.

Figure 4:
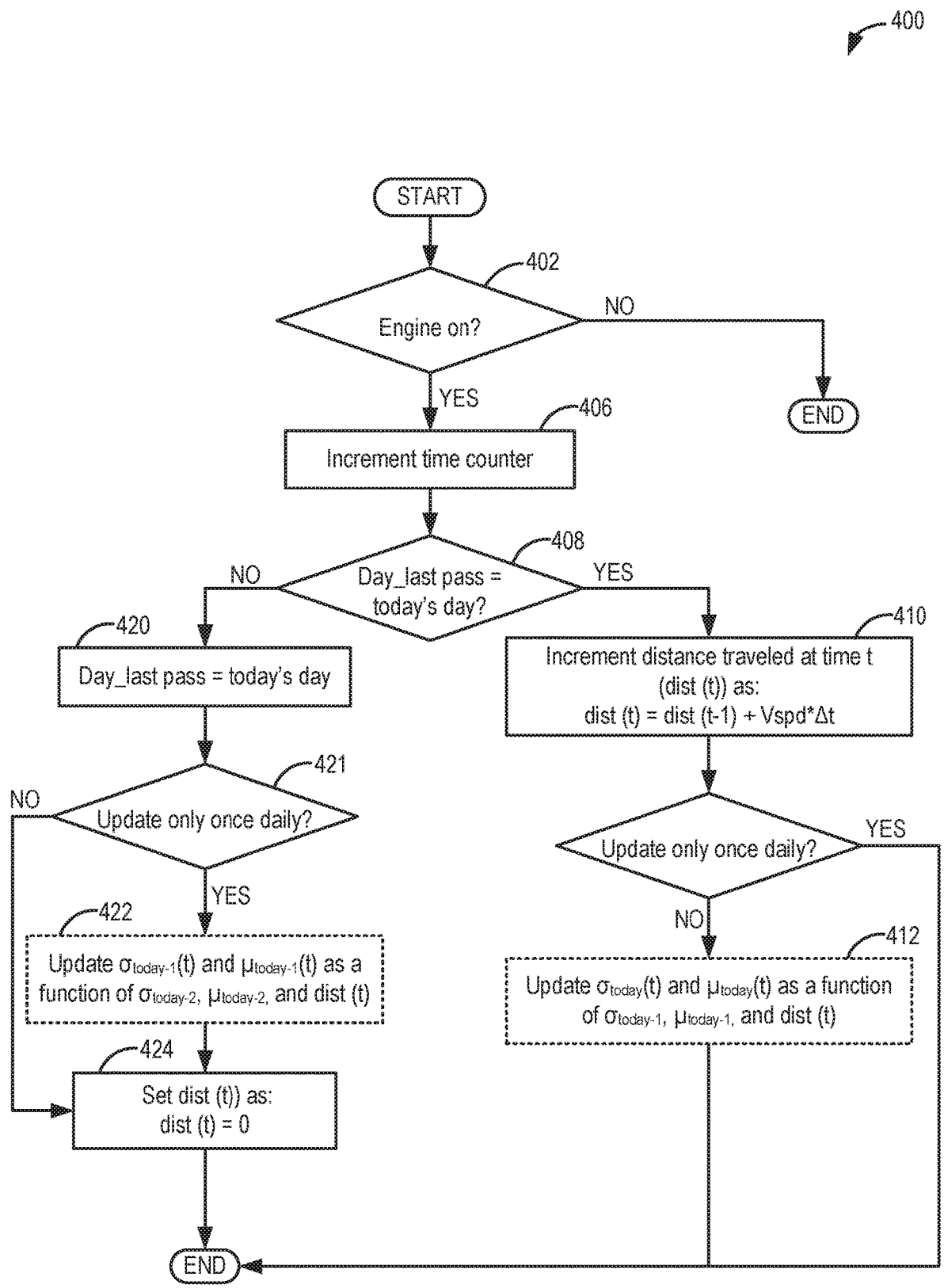
FIG. 4 shows a high level flow chart of an example method for applying a statistical estimation to a sensed state of health of a vehicle component to predict a remaining life of the component.

Turning now to FIG. 4, an example method 400 is shown for estimating a time or distance to service information for a vehicle component. The algorithm relies on the statistical characterization of a driving frequency or duration as a function of absolute time. The prediction of distance (or time) left is made based on a past degradation rate of the component together with the past driving statistics of the vehicle. The distance estimation may be determined as the product of the remaining timing left before degradation of the component (in days) and the distance driven by the vehicle per day. An accuracy of the distance estimation may be further enhanced by accounting for driving variations (e.g., driving variations for specific days of the week, or variations between weeks) and also to account for a safety margin that better ensures a healthy operation of the component during the estimated remaining life.

For example, at any given time, the algorithm may rely on a degradation rate model to augment the standard deviation as:

$$\% \text{ degradation}(t) = \text{mu}_{degradation}(t) + n*\text{sigma}_{degradation}(t)$$

where n is the safety factor that can be calibratible, and where $\text{mu}_{degradation}(t)$ and $\text{sigma}_{degradation}(t)$ are the real time estimates of the degradation model.

At 402, the method includes confirming that the engine is on. For example, where the vehicle is a hybrid vehicle, it may be confirmed that the vehicle is operating in an engine mode, or an assist mode with at least a portion of the torque demand being provided by engine torque. If the engine is not on, the routine may end. In the electric mode, since there is no air flow through the air filter, so no degradation is expected. The same applies to other gasoline engine related components (like an oil filter, coolant pump, etc.). Other components such as a battery and an alternator are still operational during the electric mode operation. Therefore, they may still be monitored/prognosed while the engine is off.

At 406, the method includes incrementing a time counter so as to provide a real-time estimate of time (t) elapsed. Next, at 408, the method includes checking if the last pass of the algorithm was performed on the current day when the routine is being performed ("today"). At 410, the method includes incrementing the distance traveled at time t as:

$$\text{dist}(t) = \text{dist}(t-1) + V\text{spd}*\Delta t,$$

wherein dist (t) is distance covered at time t, dist (t−1) is distance covered at the last iteration of the routine (t−1), Vspd is vehicle speed, and $\Delta t$ is time elapsed since the last iteration of the routine.

At 412, the method optionally includes recursively updating one or more statistical parameters of data collected for the assessed component, the one or more statistical parameters including a mean value of the collected data ($\mu_{today}(t)$) and a standard deviation value of the collected data ($\sigma_{today}(t)$). The updated values are then stored as a function of previous values stored at the time of the last iteration of the routine (e.g., the last week) and the distance covered (dist (t)). Depending on how often the algorithm is expected to report/update the remaining life of the component being monitored/prognosed, the routine is either updated day after day, or within the same day in case the target component may tend to degrade fast.

Returning to 408, if the current pass of the algorithm is being performed on the fixed day ("today") selected for performing the routine, then at 420, it may be indicated that the day of the last pass of the routine is the current day (today's day). At 422, the method optionally includes recursively updating one or more statistical parameters of data collected for the assessed component, the one or more statistical parameters including a mean value of the collected data ($\mu_{today-1}(t)$) and a standard deviation value of the collected data ($\sigma_{today-1}(t)$). The updated values are then stored as a function of previous values stored at the time of the last iteration of the routine (e.g., the last week) and the distance covered (dist(t)), that is last week's estimates of $\mu_{today-1}$, $\sigma_{today-1}$, and dist(t). Here mu and sigma estimates are updated based on the old values (from the last pass) and the distance traveled in the last day.

At 424, the method includes setting the distance covered to zero to reinitialize the distance counter in the new day. That is, the controller may set dist(t)=0. As an example, assume the driving statistics are for a given day of the week, say Sunday. To update the statistics (that is, the signal and mu values for Sunday) on Sunday of the current week, the algorithm may proceed in one of two ways. In a first option, the controller may estimate or update the values in real-time (that is, continuously) and store the result every time new data is collected. Here the inputs may be sigma(d, w−1), mu(d, w−1), and dist(d, t). The outputs generated are sigma (d, w), and mu(d, w). In the second option, the controller may keep collecting driving data on Sunday and wait until Monday to update the driving statistics for Sunday in one shot (that is, in discrete events) and store the new result. Here the inputs may be sigma(d−1, w−1), mu(d−1, w−1), and dist(d, t). The outputs generated are sigma (d−1, w), and mu(d−1, w).

In this way, the algorithm of FIG. 4 relies on the statistical characterization of the health of a component as a function of time. By performing the life ahead prediction based on the past degradation rate, and performing a linear or non-linear approximation to estimate the remaining time of the component, a more reliable prognostics approach is provided. By also mapping the time left to service into distance information using driving statistics, the information may be relayed to the vehicle operator in a format that is clearer, enabling the vehicle operator to timely service the component, and optionally adjust their driving patterns/habits.

Figure 5:
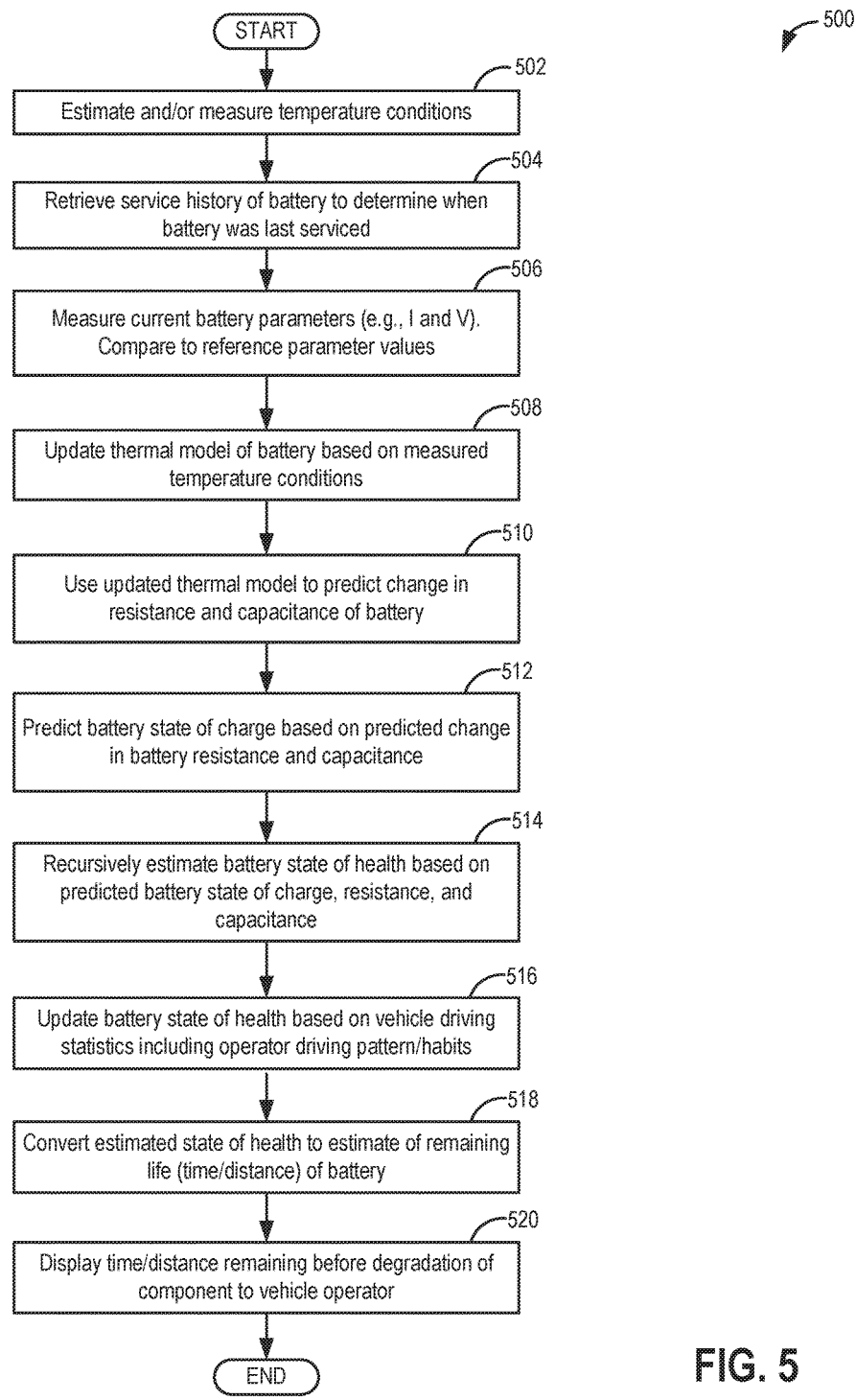
FIG. 5 shows an example routine that may be used to predict the remaining life of a vehicle battery.
Figure 6:
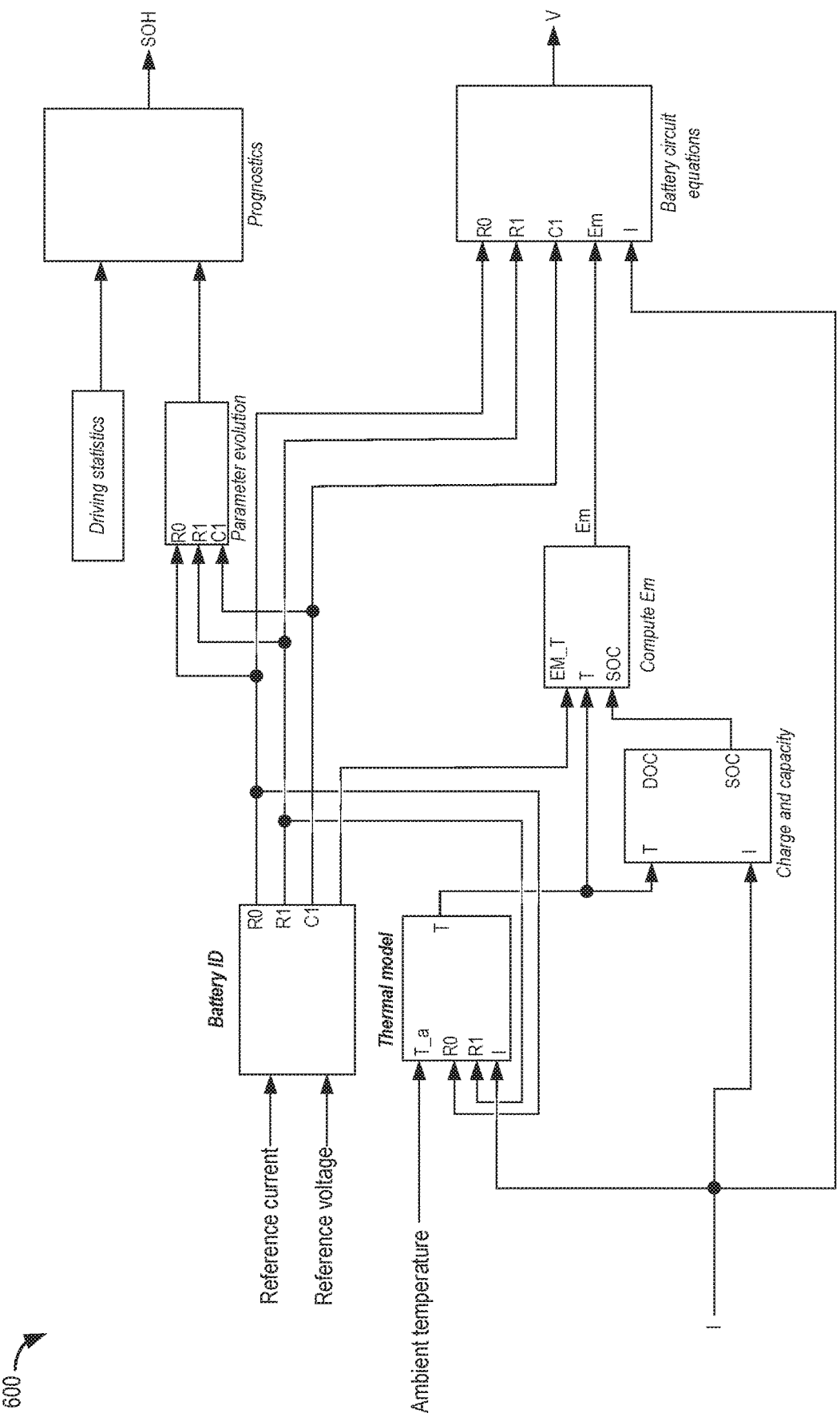
FIG. 6 shows a block diagram of an example algorithm that may be used to predict the remaining life of a vehicle battery.

Turning now to FIG. 5, an example routine 500 is shown for accurately estimating the remaining life of a vehicle system battery. FIG. 6 depicts the algorithm of FIG. 5 as a block diagram. The method diagnoses and prognoses the state of health of an automotive battery. The method includes a learning-based high-level approach that can be applied to all types of automotive batteries including lead-acid and lithium-ion batteries. The equivalent circuit parameters are identified regularly, at fixed intervals, and are assumed to explicitly depend on the battery temperature ($\theta$) and state of charge (SOC).

The state of health (SOH) of a battery can be expressed as a percent of remaining life that varies from 100% for new batteries to 0% for dead batteries. As the battery ages, and its SOH decreases, its internal resistance increases and its internal capacity decreases. The prognostic algorithm of FIGS. 5-6 uses a weighted expression of the SOH that takes into account those increases in R and decreases in C as per the phenomena:

$$SOH = SOH_R * SOH_C$$

The internal R and C are related to the estimated R0, R1, and C1 that are monitored and thereby the SOH is estimated. Map 700 of FIG. 7 depicts the change in internal C of a battery over time while map 750 of FIG. 7 depicts the change in internal R of the battery over time.

Turning now to method 500 of FIG. 5, at 502, the method includes estimating and/or measuring temperature conditions. These include, for example, ambient temperature, battery temperature, etc. At 504, the method includes retrieving the service history of the battery to determine when the battery was last serviced. The last service of the battery may include the battery being replaced, repaired, or reset. For example, a duration or distance traveled by the vehicle since the battery was last serviced may be retrieved. In addition, the rate of degradation of the battery at the last service, as well as the nature/cause of degradation at the last service may also be retrieved. For example, it may be determined if the battery degraded due to a temperature issue (e.g., due to overheating), due to aging, due to a higher than expected rate of wear and tear, due to a vehicle event/accident, etc.

At 506, the method includes measuring battery parameters in real-time. For example, a real-time estimation of battery current (I) and battery voltage (V) may be performed. The real-time estimated values may be compared to reference values of the parameters. As elaborated herein, the controller may predict a state of degradation of a vehicle component based on determined metric derived from a sensed vehicle operating parameter, including a past history of the determined metric, and then convert the predicted state of degradation into a remaining time or duration estimate for display to a vehicle operator based on past driving history data and predicted future driving, including the past history of the determined metric. In the depicted example, the component is a system battery, the determined metric is one or more of a battery resistance and a battery capacitance, and the sensed vehicle operating parameter includes one or more of a battery current and a battery voltage. Measuring the battery parameters in real-time includes measuring during vehicle operation, as vehicle and engine operating conditions change. For example, the vehicle operating parameter may be sensed during transient and steady-state vehicle operating conditions. The controller may subsequently weight the vehicle operating parameter sensed during transient vehicle operating conditions differently (e.g., higher than) the vehicle operating parameter sensed during steady-state vehicle operating conditions.

At 508, the method includes updating a thermal model of the battery based on the measured temperature conditions. For example, the equivalent circuit parameters may be normalized to a reference temperature. As a result, the effect of temperature change is reduced (in one example, eliminated) from the variation of the equivalent circuit parameters as the battery ages. Thus, the reference plots in FIG. 7 become one dimensional and independent of temperature. At 510, the method includes using the updated thermal model to predict a change in the resistance and capacitance of the battery. For example, as seen in FIG. 7, the normalized internal resistance and capacitance may be expected to change as the battery's state of health changes.

At 512, the method includes predicting the battery state of charge (SOC) based as part of the recursive estimation of the equivalent circuit model. For example, a higher state of degradation of the battery may be predicted as the battery resistance increases or as the battery capacitance decreases. At 514, the method includes recursively estimating the battery state of health based on the predicted battery state of charge, resistance, and capacitance. For example, as the battery ages, its internal resistance is expected to increase whereas its capacitance decreases. As one example, the estimated battery state of health may include a percentage life used estimate. For example, if the state of health is 60%, it indicates that 60% of the life of the battery has been used, and only 40% of the battery life remains for use.

As an example, the controller may estimate a value of the determined metric (herein the battery resistance and capacitance) as a function of a most recent estimate of the determined metric retrieved from the past history of the determined metric, and a distance travelled by the vehicle since the most recent estimate of the determined metric. Further still, the controller may estimate a value of the determined metric as a function of an initial estimate of the determined metric, retrieved from the past history of the determined metric at a time of installation of the component in the vehicle. The past driving history and the predicted future driving may include one or more of a degree of driving aggressiveness, a rate of pedal application, frequent trip time patterns, habitual probability patterns, route-based statistical profiles, and environmental attribute profiles, the environmental attribute profiles including past and predicted weather events along the route of vehicle travel.

At 516, the method includes updating the battery state of health based on vehicle driving statistics including operator driving pattern and habits. The operator driving patterns and habits may include driving patterns and habits retrieved from a past driving history data as well as predicted future driving data. The algorithm using for battery state of health estimation may be rely on a base fixed rate of degradation. However, as explained with reference to FIG. 2, there may be events that cause the rate of degradation to increase or decrease from the fixed rate. Some of these events may be external to the vehicle engine, such as weather events including precipitation (which may affect the component due to an increase in ambient humidity). Other events may include operator driving patterns, such as how aggressively the operator tends to drive, if the operator drives steadily versus applies the accelerator and brake pedals frequently, the average speed at which the vehicle is driven, the average mode the vehicle is driven in (e.g., engine or electric mode in a hybrid vehicle), etc. Further, a future (e.g., predicted) driving pattern may be taken into account, such as the terrain, ambient altitude and temperature, predicted pedal events, and inclines/declines that are expected along a selected navigational route. For example, if the operator applies the accelerator and brake pedals frequently (or is expected to in view of the selected travel route), the battery may drain faster. As another example, if the operator drives aggressively, the battery may heat up faster, and wear due to higher average battery temperatures. With reference to the earlier example, if the originally estimated state of health is 60%, based on the driving statistics, the state of health may be updated to 68%, indicating that due to the vehicle driving statistics, the battery can be expected to degrade faster.

At 518, the method includes converting the estimated state of health into an estimate of a remaining life of the battery, the remaining life estimate provided as a time or distance remaining before the battery needs to be serviced. In particular, the controller may convert the predicted state of degradation into a remaining time or duration estimate for display to a vehicle operator, the converting based on past driving history data and predicted future driving, including the past history of the determined metric (herein, the past history of the battery's resistance and capacitance profile). The controller may use the estimated state of health and the current vehicle distance estimate (e.g., as indicated by an odometer of the vehicle) to compute the remaining life. Further, the converting may be based on an absolute distance travelled by the vehicle, retrieved from the past driving history data.

At 520, the controller may display the estimated time/ distance remaining till component degradation to the vehicle operator, for example, on a display on the center console of the vehicle. For example, it may be displayed that "the battery will need to be replaced in 120 miles". This may provide the operator with a more comprehensible estimate of when the battery needs to be serviced. In addition, the displayed estimate may prompt the vehicle operator to adjust their driving pattern, for example, the operator may be prompted to drive less aggressively. Further, the controller may convert the predicted state of degradation into a remaining number of fuel tank refilling events for display to the vehicle operator based on the past driving history data and predicted future driving.

In this way, the method of FIG. 5 explicitly considers the effects of the battery temperature θ and SOC on the identification of the state of health, and builds 3D (discrete domain) maps of the RC parameters as a function of θ and SOC. In addition, the proposed discrete domain map allows for easier "physicality" constraints and can be related to the different time scales of the system.

The strategy is essentially a learning-based approach where the RC parameters are identified "regularly" during the lifetime of the battery to yield SOH and time estimation. Consider an nth order Randel's Model depicted in FIG. 13 (a 1st order model would have only one R-C element).

The equivalent circuit parameters are estimated in a "quick" way as function of temperature and SOC. Extensions to higher order Randel's models are possible. The obtained $R_0(T, SOC)$, $R_1(T, SOC)$, and $C_1(T, SOC)$ are monitored as the battery ages to yield an estimate of the remaining useful life and time change.

The Kirchhoff Laws applied to the equivalent circuit model yield:

$$\frac{dv_c}{dt} = \frac{-v_c}{R_1(\theta)} + \frac{i}{C_1(\theta)}$$
$$v = R_0(\theta)i + v_c$$

Transforming the above equations into the Laplace domain gives:

$$sV_c(s) = \frac{-V_c(s)}{R_1(\theta)} + \frac{I(s)}{C_1(\theta)}$$
$$V(s) = R_0(\theta)I(s) + V_c(s)$$

The corresponding Transfer Function is determined as:

$$H(s, \theta) = \frac{V(s)}{I(s)} = \frac{(R_0(\theta) + R_1(\theta)) + R_0(\theta)R_1(\theta)C_1(\theta)s}{1 + R_1(\theta)C_1(\theta)s}$$

Using Tustin's rule $$(s \leftarrow (2z-1)/(Tz+1)),$$

the corresponding discrete time transfer function can then be expressed as shown in FIG. 14.

A recursive method can then be used to minimize the error between predicted and measured voltage as:

$x_k = x_{k-1} + \gamma \lambda^k \in_k \Phi_k^T$ where $\in_k$ is the error measure, $\lambda$ is a forgetting factor and $\gamma$ is a gain matrix.

Figure 15:
FIG. 15 shows a two-way map for transformation between discrete and physical domain equivalent circuit parameters.

In this way, a two-way map, for example as shown in FIG. 15, allows for transformation between discrete and physical domain equivalent circuit parameters. Physicality constraints then need to be imposed to ensure that R>0 and C>0. The updated formula is an "approximate" in that it imposes constraints on the magnitude of the update at each time sample.

The symmetry of the formula is noteworthy.

The online identification is then run "repeatedly" for different entry conditions of θ and SOC. A 3D map is then built for the equivalent circuit parameters as:

$R_0 = f_1(\theta, SOC)$ $R_1 = f_2(\theta, SOC)$ $C = f_3(\theta, SOC)$

The initial parameters ($R_0(0)$, $R_1(0)$, and $C_1(0)$) can be obtained from an offline estimation. Cranking properties and observed system time constraints can be used to also initialize the algorithm.

$$V_{k1} = b_0(\theta)I_{k1} + b_1(\theta)I_{k1-1} - a_1(\theta)V_{k1-1}$$
$$V_{k2} = b_0(\theta)I_{k2} + b_1(\theta)I_{k2-1} - a_1(\theta)V_{k2-1}$$
$$V_{k3} = b_0(\theta)I_{k3} + b_1(\theta)I_{k3-1} - a_1(\theta)V_{k3-1}$$

A closed formula then yields $a_1$, $b_0$, and $b_1$, where $k_1$, $k_2$, and $k_3$ are discrete time instants that should be selected during the initial discharge phase.

In this way, a controller may predict a state of degradation of a vehicle battery based on change in battery resistance and capacitance from initial values estimated at a time of installation in the vehicle system, over a duration of vehicle travel, and further based on a distance traveled by the vehicle over the duration, the battery resistance and capacitance derived from a sensed battery current or voltage. The controller may then convert the predicted state of degradation into an estimate of time or duration remaining before the battery needs to be serviced for display to a vehicle operator, the converting based on each of past driving history data and predicted future driving. Herein the battery voltage or current sensed during transient vehicle operating conditions may be weighted different from battery voltage or current sensed during steady-state vehicle operating conditions. For example, the battery voltage or current sensed during transient vehicle operating conditions may be weighted higher than battery voltage or current sensed during steady-state vehicle operating conditions.

FIG. 6 depicts the algorithm of the method of FIG. 5 as a block diagram. Block diagram 600 shows the interconnection between the different components of the state of health (SOH) estimation of the battery. The inputs to the first block, namely the battery identification, are the current and voltage. This component, through an online estimation, updates the equivalent circuit model parameters namely R0, R1, and C1 under appropriate entry conditions. The obtained values are then normalized to reference values corresponding to a reference temperature using the thermal model block. The explicit dependence on the state of charge (SOC) (or equivalently, Depth of Discharge) is ensured through the real-time estimation of the SOC and open circuit voltage Em using the "Charge and capacity" and the "Em calculation" blocks. The outputs of these different components are then fed into the parameter evolution block that allows to log the change of the equivalent circuit model parameters as the battery ages. The trend along with the input from the "driving statistics" block allow the prognostics to run and yield an estimate on the remaining life of the battery. The algorithm also includes a battery circuit equation model that allows the prediction of the voltage output of the battery for any input current using the estimated values of Em, R0, R1 and C1.

In this way, a controller may predict a state of degradation of a vehicle component based on change in a metric associated with the vehicle component over a duration, and a distance traveled by the vehicle over the duration, the metric derived from a sensed vehicle operating parameter. The controller may then convert the predicted state of degradation into a remaining time or duration estimate for display to a vehicle operator based on past driving history data and predicted future driving. The controller may then display the remaining time or duration estimate to the vehicle operator as a number of fuel tank refill events remaining until the vehicle component needs to be serviced. The past driving history and the predicted future driving may include one or more of a degree of driving aggressiveness, a rate of pedal application, frequent trip time patterns, habitual probability patterns, route-based statistical profiles, and environmental attribute profiles, the environmental attribute profiles including past and predicted weather events along a route of vehicle travel. The converting may be based on the distance traveled includes converting with a factor based on a current vehicle odometer reading. When the vehicle component is a system battery, as in the depicted case, the sensed vehicle operating parameter includes a battery current and a battery voltage. When the vehicle component is an engine intake air filter, as described in FIG. 8, the sensed vehicle operating parameter includes one of a manifold air flow and a manifold air pressure. The change in metric over the duration may include a change from an initial value of the metric estimated at a time of installation of the vehicle component. The predicting may include raising the state of degradation of the vehicle component towards a fully degraded state as a difference between a current value of the metric relative to the initial value of the metric increases above a threshold, the threshold based on the distance traveled by the vehicle over the duration.

Figure 8:
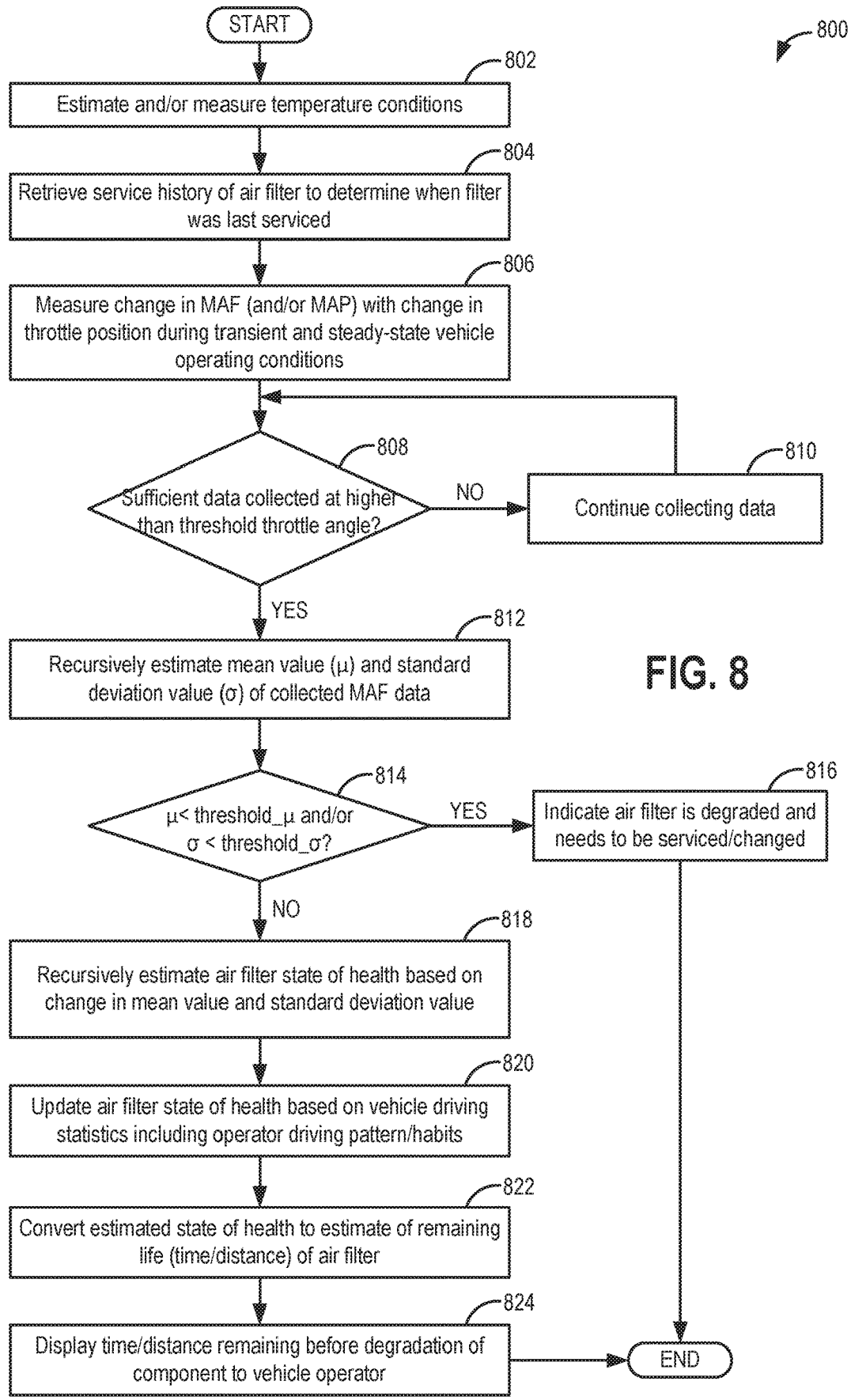
FIG. 8 shows an example routine that may be used to predict the remaining life of a vehicle engine intake air filter.

Turning now to FIG. 8, an example method 800 is shown for estimating the remaining life of an engine intake air filter based on manifold air flow and/or manifold air pressure measurements. The method enables a vehicle operator to be informed of a time or distance of vehicle travel remaining before the air filter needs to be services/replaced.

At 802, the method includes estimating and/or measuring engine conditions. These may include, for example, engine temperature conditions such as engine temperature, air temperature, ambient temperature, etc. At 804, the method includes retrieving the service history of the air filter to determine when the air filter was last serviced. The last service of the air filter may include the air filter being replaced, repaired, or reset. For example, a duration or distance traveled by the vehicle since the air filter was last serviced may be retrieved. In addition, the rate of degradation of the air filter at the last service, as well as the nature/cause of degradation at the last service may also be retrieved. For example, it may be determined if the air filter degraded due to due to aging, due to a higher than expected rate of wear and tear, due to poor air quality, due to a vehicle event/accident, etc.

At 806, the method includes measuring a change in manifold air flow (MAF) and/or a change in manifold pressure (MAP) with a change in throttle position during vehicle operation, including during transient and steady-state vehicle operating conditions. Specifically, as operator torque demand varies, the controller monitors the variation in the commanded throttle angle to the measured MAF or MAP to assess a pressure drop resulting from increased clogging of the air filter. Herein the vehicle component being assessed is an engine intake air filter, a metric associated with the filter that is determined is one or more of a mean value and a standard deviation value of air flow through the filter, and the sensed vehicle operating parameter based on which the metric is determined includes manifold air flow. The controller may weigh the manifold air flow sensed at higher intake throttle angles higher than the manifold air flow sensed at lower throttle angles. Alternatively, the controller may weigh the vehicle operating parameter sensed during transient vehicle operating conditions higher than the sensed vehicle operating parameter sensed during steady-state vehicle operating conditions. In some examples, in addition to, or in placed of MAF, the vehicle operating parameter being sensed may include manifold air pressure relative to barometric pressure. At 808, the method includes confirming if sufficient data has been collected at a higher than threshold throttle angle. That is, the predicting of the state of health may be perform only after a threshold amount of airflow data has been collected with an intake throttle at the throttle angle above an upper threshold value. For example, it may be confirmed that sufficient data has been collected at throttle angles of 55 degrees or more. By giving a higher weightage to data collected at larger throttle angles, the effect of the throttle state on the MAF or MAP measurement may be reduced. For large throttle angles, the impact of the throttle plate as a restriction to the flow is largely reduced. The expected effect of increased clogging of the air filter is a decrease in the measured mean value of MAF or MAP at large throttle angles, and a decrease in the corresponding standard deviation. As the air filter gets more clogged, quick transients of MAF or MAP at the level of the air filter may become more difficult. Consequently, by relying on data collected at larger throttle angles, in the presence of transients, filter clogging can be better determined. In addition, the need for steady-state vehicle operation for assessing the air filter is reduced.

If sufficient data has not been collected, at 810, the method continues to collect data. If sufficient data has been collected, such as when more than a calibratable amount of the collected data has been collected at the higher throttle angle, the method moves to 812 wherein the controller recursively estimates a mean value (mu or μ) and a standard deviation value (sigma or σ) of the collected MAF data. The mean value represents an average value of airflow through the air filter while the standard deviation value represents a spread of the collected airflow readings.

At 814, it may be determined if the estimated mean value is lower than a threshold and/or the estimated standard deviation value of MAF/MAP at larger throttle angles is lower than a threshold. Alternatively, the estimated mean and standard deviation values may be compared to expected values. The expected values of the airflow readings may be based on each of a distance traveled by the vehicle, a past driving history data of the vehicle, predicted future driving of the vehicle, and an initial value of airflow readings at a time of installation of the air filter in the vehicle. In one example, the mu threshold is a value that indicates that the maximum airflow or average of the manifold absolute pressure. Likewise, the sigma threshold is a value that indicates the easiness with which transients flow through the air filter. If any one of the mean and the standard deviation value is below the corresponding threshold, at 816, it may be indicated that the air filter is degraded and that it needs to be serviced or changed. In this way, the air filter may be diagnosed based on the measured change in mu and/or sigma.

If one or more of the estimated mean value and the estimated standard deviation value is higher than the corresponding threshold, then at 818, the method includes recursively estimating the air filter state of health based on a change in the mean value and/or the standard deviation value. For example, the controller may predicting a higher state of degradation (filter is more degraded) as one or more of the mean value and the standard deviation value decreases. The change may include a change since a last iteration of the routine, a change since the air filter was last serviced, or a change since the air filter was installed in the vehicle. As described with reference to the examples of FIGS. 10-12, as the filter gets clogged, the mean value of MAF/MAP measured at the filter may start to drop. In addition, the data may be less scattered, resulting in a drop in the standard deviation value. As one example, the estimated air filter state of health may include a percentage life used estimate. For example, if the state of health is 60%, it indicates that 60% of the life of the air filter has been used, and only 40% of the air filter life remains for use.

Figure 9:
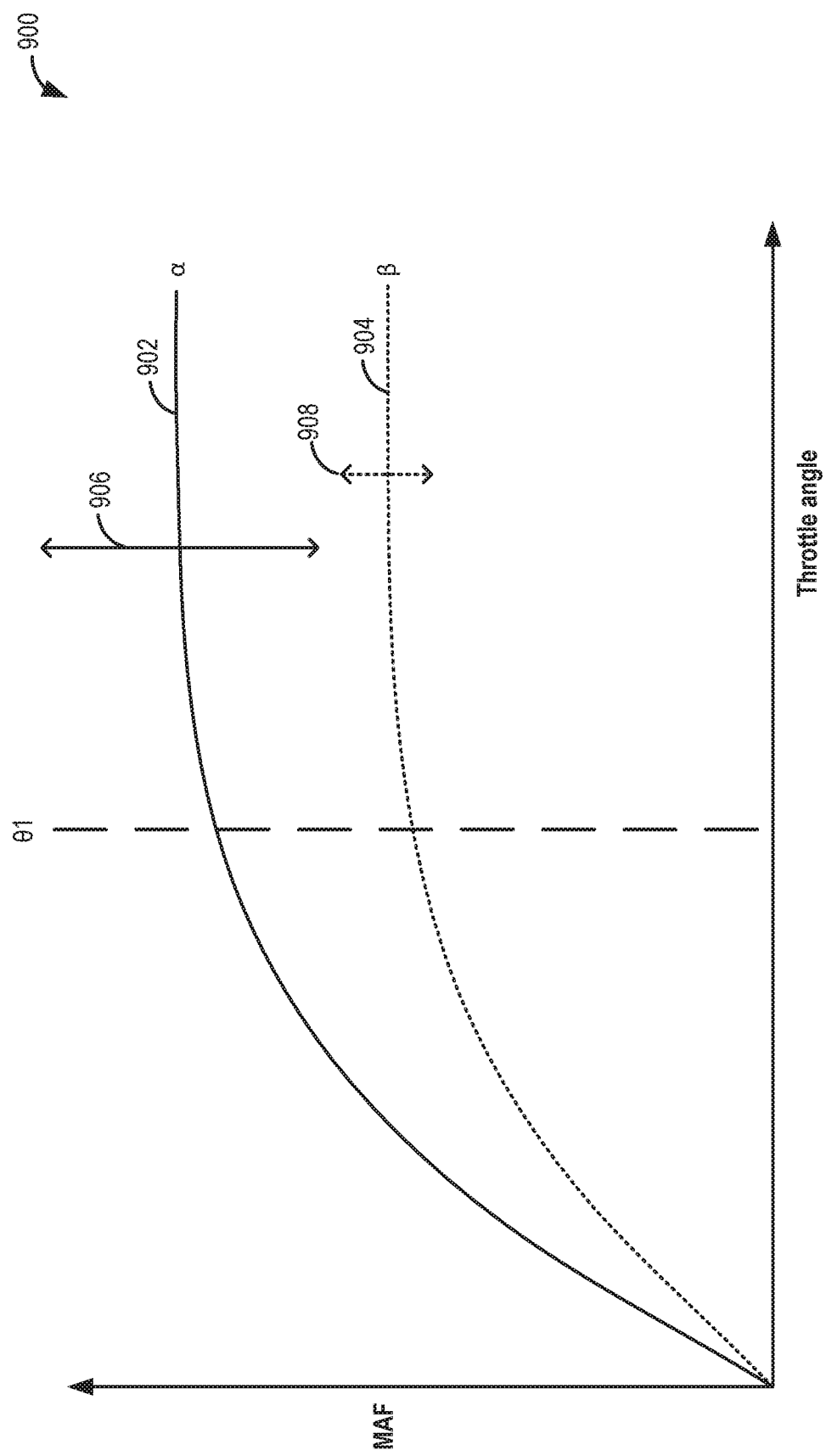
FIG. 9 shows a map depicting an example change in manifold air flow through an air filter at different intake throttle angles.

FIG. 9 shows an example of the effect filter clogging on statistical parameters of the measured air mass flow. Map 900 depicts change in MAF with throttle angle for a green (fully clean or unclogged) air filer at plot 902 (solid line) including a mean value and a standard deviation 906 (solid line). Map 900 further depicts change in MAF with throttle angle for a fully clogged air filer at plot 904 (dashed line) including a mean value and a standard deviation 908 (dashed line). In the depicted example, MAF at larger throttle angles, such as angles above θ1, vary between a value of α (MAF for green filter) and β (MAF for clogged filter). Based on the calibrated MAF mean and standard deviation value of the green filter versus the clogged filter, the filter health may be determined using the equation:

$$\% \text{ health} = 100 * \left( \frac{1}{\alpha - \beta} MAF - \frac{\beta}{\alpha - \beta} \right)$$

It will be appreciated that in alternate examples, MAP may be measured in which case MAP at larger throttle angles, such as angles above θ1, may vary between a value of α (MAP for green filter) and β (MAP for clogged filter). Based on the calibrated MAF mean and standard deviation value of the green filter versus the clogged filter, the filter health may be determined using the equation:

$$\% \text{ health} = 100 * \left( \frac{1}{\alpha - \beta} MAP - \frac{\beta}{\alpha - \beta} \right)$$

For a data set $X_i$, where i=1 . . . N, and ordered data $X_i = \{x_1, x_2, \ldots x_N\}$, $$\sigma(N) = \frac{\sum_{i=1}^{N} x_i}{N};$$

$$\mu(N+1) = \frac{\sum_{i=1}^{N+1} x_i}{N+1} = \frac{\left(\sum_{i=1}^{N} x_i\right) x_{N+1}}{N} * \frac{N}{N+1}$$

$$= \frac{N}{N+1} * \left[ \frac{\left(\sum_{i=1}^{N} x_i\right)}{N} + \frac{x_{N+1}}{N} \right]$$

$$= \frac{N}{N+1} * \left[ \mu(N) + \frac{x_{N+1}}{N} \right];$$

For a data set $X_i$, where i=1 . . . N, and ordered data $X_i = \{x_1, x_2, \ldots x_N\}$, assuming that for large N, $\mu(N+1) \sim \mu(N)$; we get:

$$\sigma(N) = \sqrt{\frac{\sum_{i=1}^{N}(x_i - \mu(N))^2}{N-1}} =$$

$$\sigma(N+1)^2 = \frac{\sum_{i=1}^{N+1}(x_i - \mu(N+1))^2}{N}$$

$$\sigma(N+1)^2 = \frac{\sum_{i=1}^{N}(x_i - \mu(N+1))^2 + (x_{N+1} - \mu(N+1))^2}{N-1} \left(\frac{N-1}{N}\right)$$

$$\sigma(N+1)^2 \sim \frac{\sum_{i=1}^{N}(x_i - \mu(N))^2 + (x_{N+1} - \mu(N+1))^2}{N-1} \left(\frac{N-1}{N}\right)$$

$$\sim \left[ \sigma(N)^2 + \frac{(x_{N+1} - \mu(N+1))^2}{N-1} \right] \left(\frac{N-1}{N}\right)$$

where:

$$\sigma(N+1) \sim \sqrt{\left[\sigma(N)^2 + \frac{(x_{N+1} - \mu(N+1))^2}{N-1}\right] \left(\frac{N-1}{N}\right)}$$

$$\mu(N+1) \sim \frac{N}{N+1} * \left[ \mu(N) + \frac{x_{N+1}}{N} \right];$$

The above equations show a step by step derivation of the recursive estimation of mu and sigma based on old values (values determined of a last pass), new estimates ($x_{N+1}$), and the current data counter (N).

Returning to FIG. 8, at 820, the method includes updating the air filter state of health based on vehicle driving statistics including operator driving patterns and habits. The algorithm used for air filter state of health estimation may be relying on a base fixed rate of degradation. However, as explained with reference to FIG. 2, there may be events that cause the rate of degradation to increase or decrease from the fixed rate. Some of these events may be external to the vehicle engine, such as weather events including precipitation (which may affect the component due to an increase in ambient humidity). Other events may include operator driving patterns, such as how aggressively the operator tends to drive, if the operator drives steadily versus applies the accelerator and brake pedals frequently, the average speed at which the vehicle is driven, the average mode the vehicle is driven in (e.g., engine or electric mode in a hybrid vehicle), etc. For example, if the operator applies the accelerator and brake pedals frequently, or drives aggressively, air flow through the filter may change more frequently, causing more wear and tear. With reference to the earlier example, if the originally estimated state of health is 60%, based on the driving statistics, the state of health may be updated to 68%, indicating that due to the vehicle driving statistics, the air filter can be expected to degrade faster.

At 822, the method includes converting the estimated state of health into an estimate of a remaining life of the air filter, the remaining life estimate provided as a time or distance remaining before the air filter needs to be serviced. The controller may use the estimated state of health and the current vehicle distance estimate (e.g., as indicated by an odometer of the vehicle) to compute the remaining life. The converting may be based on each of a past driving history data of the vehicle, including a past history of the spread of airflow readings, and predicted future driving of the vehicle. The converting may be further based on a distance traveled by the vehicle, estimated via an odometer, and the presence of selected weather events.

At 824, the controller may display the estimated time/distance remaining till component degradation to the vehicle operator, for example, on a display on the center console of the vehicle. For example, it may be displayed that "the air filter will need to be replaced in 120 miles". This may provide the operator with a more comprehensible estimate of when the air filter needs to be serviced. The controller may also display the estimate of time or duration remaining to the vehicle operator as a number of fuel tank refill events remaining until the air filter needs to be serviced. In addition, the displayed estimate may prompt the vehicle operator to adjust their driving pattern, for example, the operator may be prompted to drive less aggressively.

For example, the controller may indicate a degradation state of an engine intake air filter based on smaller than expected spread of airflow readings when throttle angle is above an upper threshold value. The indicating may be further based on a lower than expected average of the airflow readings when the throttle angle is above an upper threshold value. The controller may predict the degradation state of the air filter based on the smaller than expected spread of airflow readings and convert the predicted degradation state into an estimate of time or duration remaining before the air filter needs to be serviced for display to a vehicle operator. The converting may be based on each of a past driving history data of the vehicle, including a past history of the spread of airflow readings, and predicted future driving of the vehicle. The converting may be further based on a distance traveled by the vehicle, estimated via an odometer, and presence of selected weather events (such as snow storms, dust storms, and various forms of precipitation such as snow and rain).

In this way, the method of FIG. 8 provides an estimate of the percent life remaining of the air filter solely based on the commanded throttle angle and the measured air mass flow. Consequently, the method is able to provide an accurate estimate without requiring extensive memory or processor resources to assess the health of the air filter.

Figure 10:
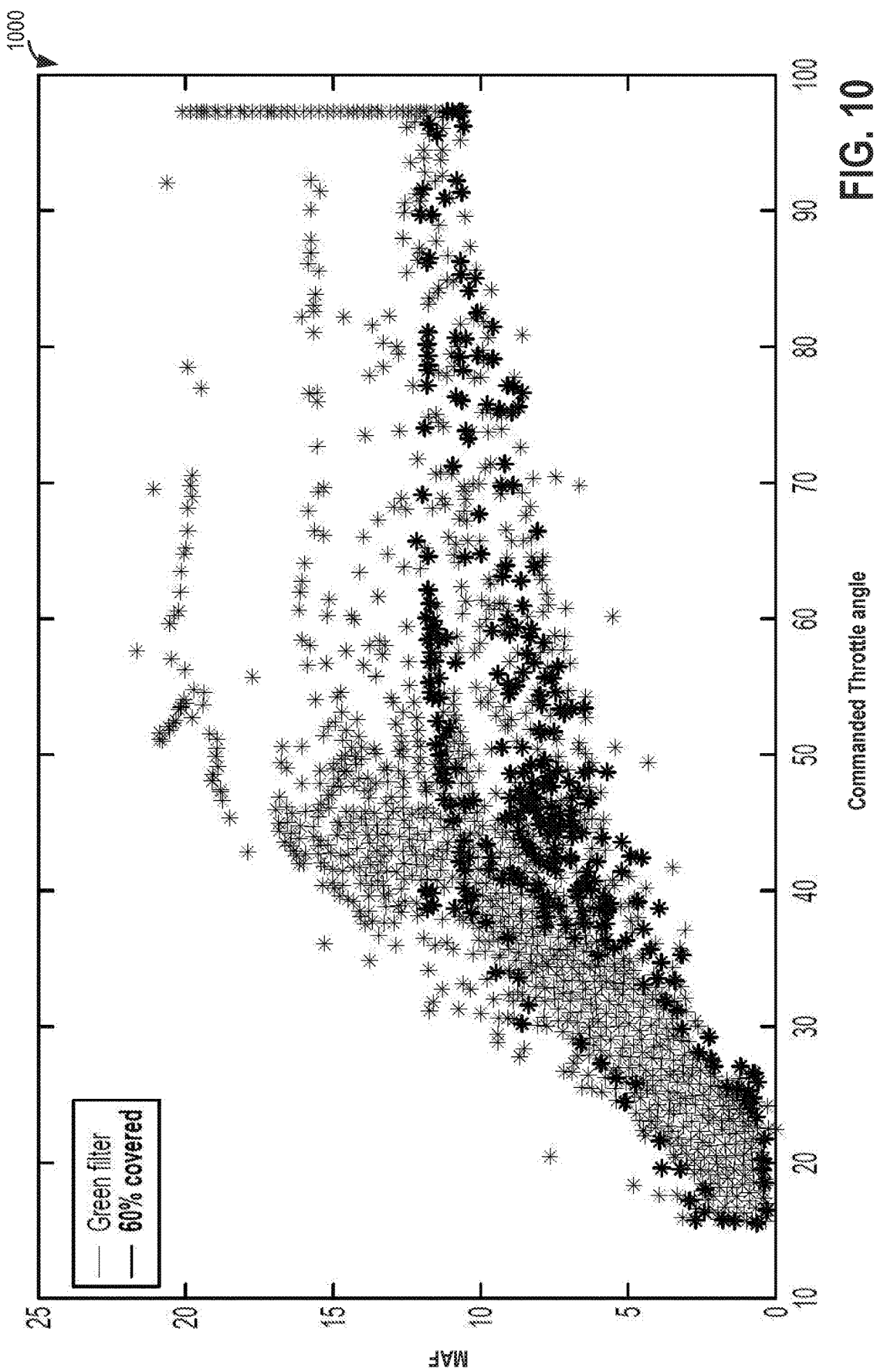
FIGS. 10 and 11 show example experimental data depicting changes in the mean value and standard deviation value of manifold air flow with change in throttle angle for filters having different degrees of clogging.
Figure 11:
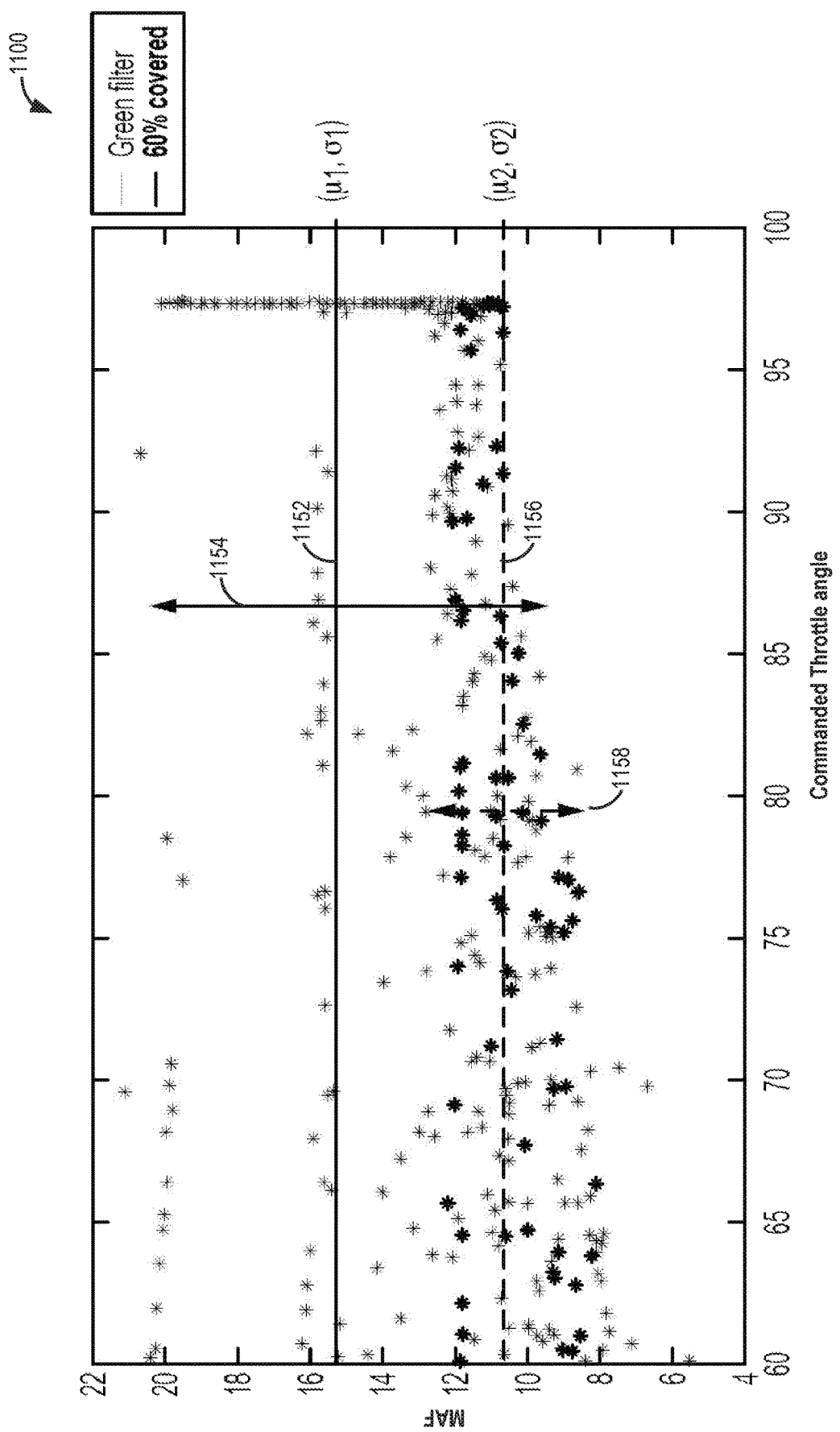
Figure 12:
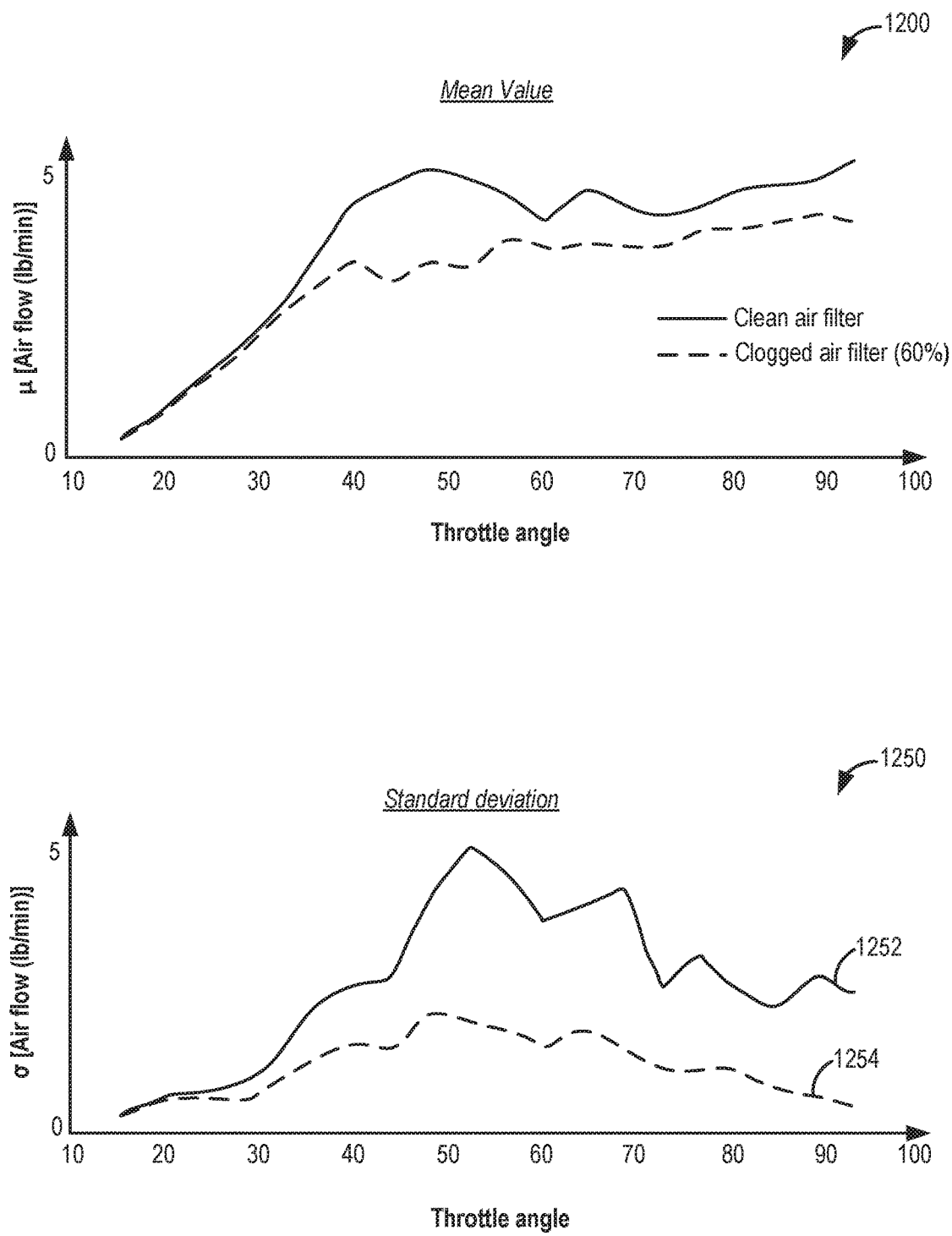
FIG. 12 graphically depicts a change in the mean value and standard deviation value of manifold air flow with change in throttle angle for filters having different degrees of clogging.

Example data depicting the trends in mu and sigma with clogging of the air filter is shown at FIGS. 10-11. Map 1000 of FIG. 10 depicts MAF data collected at different commanded throttle angles for a green filter (thinner line data points) and a 60% clogged filter (thicker lined data points). At larger throttle angles, such as above 55 degrees, the mean value of MAF is lower for the clogged filter. In addition, the standard deviation or scattering of the MAF data is lower for the clogged filter. Specifically, more of the measured MAF data at larger throttle angles are clumped closer together while for the same throttle angles, there is significantly more variation in measured MAF data for a clean filter.

Map 1100 of FIG. 11 shows a closer (zoomed in) view of the data of FIG. 10 at throttle angles above 60 degrees. By considering only larger throttle angles, the effect of other obstructions (such as throttle clogging) on the assessment is reduced. The statistical parameters of the data for the green filter are depicted including mean value ($\mu 1$) at solid line 1152 and standard deviation ($\sigma 1$) at solid arrow 1154. Likewise, the statistical parameters of the data for the 60% clogged filter are depicted including mean value ($\mu 2$) at dashed line 1156 and standard deviation ($\sigma 2$) at dashed arrow 1158. At the larger throttle angles, the mean value of MAF is lower for the clogged filter. In addition, the standard deviation or scattering of the MAF data is lower for the clogged filter. Specifically, more of the measured MAF data at larger throttle angles are clumped closer together while for the same throttle angles, there is significantly more variation in measured MAF data for a clean filter. In this way, by monitoring the change in statistical parameters for measured MAF at larger throttle angles, a change in the state of an intake air filter may be predicted.

In this way, a controller may predict a state of degradation of an engine intake air filter based on a comparison of measured manifold airflow readings relative to commanded throttle angles during vehicle operation, after a threshold amount of airflow readings have been collected above a threshold throttle angle; and then convert the predicted state of degradation into a remaining time or duration estimate for display to a vehicle operator based on past driving history data and predicted future driving. The manifold airflow readings may be collected during steady-state and transient engine operating conditions via an airflow sensor coupled downstream of an intake throttle, and the measured manifold airflow readings collected during transient engine operating conditions may be weighted higher than the measured manifold airflow readings collected during steady-state engine operating conditions. Predicting based on the comparison may include deriving each of a standard deviation value and an average value of manifold air flow based on the measured airflow readings; and increasing the predicted state of degradation as one or more of the standard deviation value and the average value fall below corresponding expected values. The deriving may include weighing manifold airflow readings measured above the threshold throttle angle higher than airflow readings measured below the threshold throttle angle. Herein the corresponding expected values are based on an initial standard deviation value and an initial average value estimated at a time of installation of the air filter in the vehicle, and further based on a vehicle distance traveled since installation of the air filter in the vehicle. Alternatively, the corresponding expected values are based on the past driving history data including a past degradation history of the air filter, and the corresponding expected values include a most recent standard deviation value and a most recent average value of manifold airflow estimated during an immediately previous iteration of the predicting. The data of FIGS. 10-11 is also depicted graphically at maps 1200 and 1250 of FIG. 12. As shown at map 1200, the mean value of MAF increases to a larger absolute value for a green filter as compared to a clogged filter. Thus, by monitoring a change in the mean value of measured MAF, a change in the degree of clogging of the filter can be estimated, and a rate of clogging of the filter over duration or distance of vehicle operation can be estimated. This, in turn, can be used to predict a time remaining before the filter will be 100% clogged. As shown at map 1250, the standard deviation value of MAF increases by a larger amount for a green filter as compared to a clogged filter. Thus, by monitoring a change in the standard deviation value of measured MAF, a change in the degree of clogging of the filter can be estimated, and a rate of clogging of the filter over duration or distance of vehicle operation can be estimated. This, in turn, can be used to predict a time remaining before the filter will be 100% clogged.

While the above examples show correlating change in statistical parameters of measured MAF with air filter clogging, it will be appreciated that change in statistical parameters of measured MAP may be similarly correlated with air filter clogging. At larger throttle angles, the effect of other obstructions (such as throttle clogging) on the air filter assessment, at a given intake pressure, is reduced. When the air filter is assessed based on the MAP estimate, the measured MAP may be compared to barometric pressure (BP). To reduce the effect of the BP change on the estimated MAP measurements, a reference BP value may be selected. The variation of the current BP value with respect to the reference value is subtracted from the mean value of the MAP measurement.

In this way, a prognostics-based approach for assessing the remaining useful life of a vehicle component is provided. The prognostics approach may be used to complement any existing prognostics feature that primarily approximates the remaining life of a component as a ratio (or a percentage) by estimating the time left and/or the distance left before the component degrades. By relying on the statistical characterization of the health of the component as a function of time and distance traveled, the remaining life of the component may be more accurately determined and provided to the vehicle operator as a more comprehensible metric.

One example method for a vehicle comprises: predicting a state of degradation of a vehicle component based on determined metric derived from a sensed vehicle operating parameter, including a past history of the determined metric; and converting the predicted state of degradation into a remaining time or duration estimate for display to a vehicle operator based on past driving history data and predicted future driving, including the past history of the determined metric. In the preceding example, additionally or optionally, the vehicle component is a system battery, the determined metric is one or more of a battery resistance and a battery capacitance, and the sensed vehicle operating parameter includes one or more of a battery current and a battery voltage. In any or all of the preceding examples, additionally or optionally, the predicting includes predicting a higher state of degradation as the battery resistance increases or as the battery capacitance decreases. In any or all of the preceding examples, additionally or optionally, the vehicle component is an engine intake air filter, the determined metric is one or more of a mean value and a standard deviation value of air flow through the filter, and the sensed vehicle operating parameter includes manifold air flow. In any or all of the preceding examples, additionally or optionally, the method further comprises weighing the manifold air flow sensed at higher intake throttle angles higher than the manifold air flow sensed at lower throttle angles. In any or all of the preceding examples, additionally or optionally, the sensed vehicle operating parameter further includes manifold air pressure relative to barometric pressure. In any or all of the preceding examples, additionally or optionally, the predicting includes predicting a higher state of degradation as one or more of the mean value and the standard deviation value decreases. In any or all of the preceding examples, additionally or optionally, the sensed vehicle operating parameter is sensed during transient and steady-state vehicle operating conditions, and the method further comprises, weighing the sensed vehicle operating parameter sensed during transient vehicle operating conditions higher than the sensed vehicle operating parameter sensed during steady-state vehicle operating conditions. In any or all of the preceding examples, additionally or optionally, the method further comprises estimating a value of the determined metric as a function of a most recent estimate of the determined metric retrieved from the past history of the determined metric, and a distance travelled by the vehicle since the most recent estimate of the determined metric. In any or all of the preceding examples, additionally or optionally, the method further comprises estimating a value of the determined metric as a function of an initial estimate of the determined metric, retrieved from the past history of the determined metric at a time of installation of the component in the vehicle. In any or all of the preceding examples, additionally or optionally, the converting is further based on an absolute distance travelled by the vehicle, retrieved from the past driving history data. In any or all of the preceding examples, additionally or optionally, the method further comprises converting the predicted state of degradation into a remaining number of fuel tank refilling events for display to the vehicle operator based on the past driving history data and predicted future driving.

Another example method for a vehicle comprises: predicting a state of degradation of a vehicle component based on change in a metric associated with the vehicle component over a duration, and a distance traveled by the vehicle over the duration, the metric derived from a sensed vehicle operating parameter; and converting the predicted state of degradation into a remaining time or duration estimate for display to a vehicle operator based on past driving history data and predicted future driving. In the preceding example, additionally or optionally, the method further comprises displaying the remaining time or duration estimate to the vehicle operator as a number of fuel tank refill events remaining until the vehicle component needs to be serviced. In any or all of the preceding examples, additionally or optionally, the past driving history and the predicted future driving include one or more of a degree of driving aggressiveness, a rate of pedal application, frequent trip time patterns, habitual probability patterns, route-based statistical profiles, and environmental attribute profiles, the environmental attribute profiles including past and predicted weather events along a route of vehicle travel. In any or all of the preceding examples, additionally or optionally, the converting based on the distance traveled includes converting with a factor based on a current vehicle odometer reading. In any or all of the preceding examples, additionally or optionally, the vehicle component is a system battery, the sensed vehicle operating parameter includes a battery current and a battery voltage, and wherein when the vehicle component is an engine intake air filter, the sensed vehicle operating parameter includes one of a manifold air flow and a manifold air pressure. In any or all of the preceding examples, additionally or optionally, the change in metric over the duration includes a change from an initial value of the metric estimated at a time of installation of the vehicle component, and wherein the predicting includes raising the state of degradation of the vehicle component towards a fully degraded state as a difference between a current value of the metric relative to the initial value of the metric increases above a threshold, the threshold based on the distance traveled by the vehicle over the duration.

Another example method for a vehicle system comprises: predicting a state of degradation of a vehicle battery based on change in battery resistance and capacitance from initial values estimated at a time of installation in the vehicle system, over a duration of vehicle travel, and further based on a distance traveled by the vehicle over the duration, the battery resistance and capacitance derived from a sensed battery current or voltage; and converting the predicted state of degradation into an estimate of time or duration remaining before the battery needs to be serviced for display to a vehicle operator, the converting based on each of past driving history data and predicted future driving. In the preceding example, additionally or optionally, the battery voltage or current sensed during transient vehicle operating conditions is weighted different from battery voltage or current sensed during steady-state vehicle operating conditions.

Still another example method for a vehicle comprises: indicating a degradation state of an engine intake air filter based on smaller than expected spread of airflow readings when throttle angle is above an upper threshold value. In the preceding example, additionally or optionally, the indicating is further based on a lower than expected average of the airflow readings when the throttle angle is above an upper threshold value. In any or all of the preceding examples, additionally or optionally, the indicating includes: predicting the degradation state of the air filter based on the smaller than expected spread of airflow readings; and converting the predicted degradation state into an estimate of time or duration remaining before the air filter needs to be serviced for display to a vehicle operator. In any or all of the preceding examples, additionally or optionally, the converting is based on each of a past driving history data of the vehicle, including a past history of the spread of airflow readings, and predicted future driving of the vehicle. In any or all of the preceding examples, additionally or optionally, the converting is further based on a distance traveled by the vehicle, estimated via an odometer, and presence of selected weather events. In any or all of the preceding examples, additionally or optionally, the predicting occurs after a threshold amount of data has been collected with an intake throttle at the throttle angle above the upper threshold value. In any or all of the preceding examples, additionally or optionally, the method further comprises displaying the estimate of time or duration remaining to the vehicle operator as a number of fuel tank refill events remaining until the air filter needs to be serviced. In any or all of the preceding examples, additionally or optionally, the expected spread of the airflow readings is based on each of a distance traveled by the vehicle, a past driving history data of the vehicle, predicted future driving of the vehicle, and an initial spread of airflow readings at a time of installation of the air filter in the vehicle. In any or all of the preceding examples, additionally or optionally, the expected average of the airflow readings is based on each of a distance traveled by the vehicle, a past driving history data of the vehicle, predicted future driving of the vehicle, and an initial average of airflow readings at a time of installation of the air filter in the vehicle.

Another example method for a vehicle comprises: predicting a state of degradation of an engine intake air filter based on a comparison of measured manifold airflow readings relative to commanded throttle angles during vehicle operation, after a threshold amount of airflow readings have been collected above a threshold throttle angle; and converting the predicted state of degradation into a remaining time or duration estimate for display to a vehicle operator based on past driving history data and predicted future driving. In the preceding example, additionally or optionally, the manifold airflow readings are collected during steady-state and transient engine operating conditions via an airflow sensor coupled downstream of an intake throttle, and wherein the measured manifold airflow readings collected during transient engine operating conditions are weighed higher than the measured manifold airflow readings collected during steady-state engine operating conditions. In any or all of the preceding examples, additionally or optionally, the predicting based on the comparison includes: deriving each of a standard deviation value and an average value of manifold air flow based on the measured airflow readings; and increasing the predicted state of degradation as one or more of the standard deviation value and the average value fall below corresponding expected values. In any or all of the preceding examples, additionally or optionally, the deriving includes weighing manifold airflow readings measured above the threshold throttle angle higher than airflow readings measured below the threshold throttle angle. In any or all of the preceding examples, additionally or optionally, the deriving includes weighing measured manifold air flow at higher than threshold throttle angles more than measured manifold air flow at lower than threshold throttle angles. In any or all of the preceding examples, additionally or optionally, the corresponding expected values are based on an initial standard deviation value and an initial average value estimated at a time of installation of the air filter in the vehicle, and further based on a vehicle distance traveled since installation of the air filter in the vehicle. In any or all of the preceding examples, additionally or optionally, the method further comprises the corresponding expected values being based on the past driving history data including a past degradation history of the air filter, and wherein the corresponding expected values include a most recent standard deviation value and a most recent average value of manifold airflow estimated during an immediately previous iteration of the predicting.

An example vehicle system comprises: an engine including an intake passage; an air filter coupled to the intake passage; an intake throttle; a manifold airflow sensor coupled downstream of the intake throttle; and a controller. The controller is configured with computer-readable instructions stored on non-transitory memory for: storing measured airflow readings when the intake throttle is commanded above a threshold throttle angle; estimating a metric indicative of a spread of manifold airflow based on the stored measured airflow readings; and predicting a state of degradation of the air filter based on the estimated metric relative to a threshold; and converting the predicted state of degradation into a remaining time or duration estimate for display to a vehicle operator based on past driving history data and predicted future driving, including a past history of the estimated metric. In the preceding example, the predicting includes predicting a higher state of degradation as the estimated metric falls below the threshold. In any or all of the preceding examples, additionally or optionally, the metric is a first metric, and the controller includes further instructions for estimating a second metric indicative of an average manifold airflow through the air filter, and wherein the predicting includes predicting the higher state of degradation as the second metric falls below the threshold. In any or all of the preceding examples, additionally or optionally, the threshold is determined as a function of a most recent estimate of the metric retrieved from the past history of the estimated metric, and a distance travelled by the vehicle since the most recent estimate of the estimated metric. In any or all of the preceding examples, additionally or optionally, the threshold is determined as a function of an initial estimate of the metric at a time of installation of the air filter, retrieved from the past history of the estimated metric, and a distance travelled by the vehicle since the installation of the air filter.

In a further representation, the method may include comparing a statistically determined metric of the sensed vehicle operating parameter to an initial statistical attribute of the sensed vehicle operating parameter, sensed at a time of installation of the vehicle component, and increasing the predicted state of degradation as the current statistical attribute falls relative to the initial statistical attribute. In another representation, the predicting of the degradation state of an air filter may include retrieving a first mean value and a first standard deviation value of the sensed airflow at a time of component installation in the vehicle; comparing the first mean value to a second mean value of the sensed airflow at a current time; comparing the first standard deviation value to a second standard deviation value of the sensed airflow at the current time; and increasing the predicted state of degradation of the air filter towards a fully degraded state as the second mean value falls below the first mean value, or as the second standard deviation value falls below the first standard deviation value. In the preceding example, additionally or optionally, the method may further comprise, in response to the second mean value or the second standard deviation value falling below a threshold, indicating that the air filter is fully degraded and needs to be replaced. In the preceding example, additionally or optionally, the manifold airflow is sensed during vehicle steady-state and transient operating conditions, and the predicting includes weighing the vehicle operating parameter sensed during vehicle transient operating conditions higher than the vehicle operating parameter sensed during vehicle steady-state operating conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
recursively predicting a state of degradation of a vehicle component by updating a previously estimated state of degradation of the vehicle component, the updating based on a sensed vehicle operating parameter from a vehicle sensor, the previously estimated state of degradation based on a determined metric, including a past history of the determined metric; and
converting the predicted state of degradation into a remaining time or duration estimate for display of the estimate to a vehicle operator on a vehicle display, the converting based on past driving history data and predicted future driving, including the past history of the determined metric.

2. The method of claim 1, wherein the vehicle component is a system battery, the determined metric is one or more of a battery resistance and a battery capacitance, and the sensed vehicle operating parameter includes one or more of a battery current and a battery voltage.

3. The method of claim 2, wherein the predicting includes predicting a higher state of degradation as the battery resistance increases or as the battery capacitance decreases.

4. The method of claim 1, wherein the vehicle component is an engine intake air filter, the determined metric is one or more of a mean value and a standard deviation value of air flow through the filter, and the sensed vehicle operating parameter includes manifold air flow.

5. The method of claim 4, further comprising weighting the manifold air flow sensed at higher intake throttle angles higher than the manifold air flow sensed at lower throttle angles.

6. The method of claim 4, wherein the sensed vehicle operating parameter further includes manifold air pressure relative to barometric pressure.

7. The method of claim 4, wherein the predicting includes predicting a higher state of degradation as one or more of the mean value and the standard deviation value decreases.

8. The method of claim 1, wherein the sensed vehicle operating parameter is sensed during transient and steady-state vehicle operating conditions, the method further comprising weighting the sensed vehicle operating parameter sensed during transient vehicle operating conditions higher than the sensed vehicle operating parameter sensed during steady-state vehicle operating conditions.

9. The method of claim 1, further comprising estimating a value of the determined metric as a function of a most recent estimate of the determined metric retrieved from the past history of the determined metric, and a distance travelled by the vehicle since the most recent estimate of the determined metric.

10. The method of claim 1, further comprising estimating a value of the determined metric as a function of an initial estimate of the determined metric, retrieved from the past history of the determined metric at a time of installation of the vehicle component in the vehicle.

11. The method of claim 1, wherein the converting is further based on an absolute distance travelled by the vehicle, retrieved from the past driving history data.

12. The method of claim 1, further comprising converting the predicted state of degradation into a remaining number of fuel tank refilling events for display to the vehicle operator based on the past driving history data and predicted future driving.

13. A method for a vehicle, comprising:
recursively predicting a state of degradation of a vehicle component by updating a previously estimated state of degradation of the vehicle component, the updating based on a sensed vehicle operating parameter from a vehicle sensor, a change in a metric associated with the vehicle component over a duration, and a distance travelled by the vehicle over the duration; and
converting the predicted state of degradation into a remaining time or duration estimate for display of the estimate to a vehicle operator on a vehicle display, the converting based on past driving history data and predicted future driving.

14. The method of claim 13, further comprising displaying the remaining time or duration estimate to the vehicle operator as a number of fuel tank refill events remaining until the vehicle component needs to be serviced.

15. The method of claim 13, wherein the past driving history and the predicted future driving include one or more of a degree of driving aggressiveness, a rate of pedal application, frequent trip time patterns, habitual probability patterns, route-based statistical profiles, and environmental attribute profiles, the environmental attribute profiles including past and predicted weather events along a route of vehicle travel.

16. The method of claim 13, wherein the converting based on the past driving history data and predicted future driving includes converting with a factor based on a current vehicle odometer reading.

17. The method of claim 13, wherein when the vehicle component is a system battery, the sensed vehicle operating parameter includes a battery current and a battery voltage, and wherein when the vehicle component is an engine intake air filter, the sensed vehicle operating parameter includes one of a manifold air flow and a manifold air pressure.

18. The method of claim 13, wherein the change in metric over the duration includes a change from an initial value of the metric estimated at a time of installation of the vehicle component, and wherein the predicting includes raising the state of degradation of the vehicle component towards a fully degraded state as a difference between a current value of the metric relative to the initial value of the metric increases above a threshold, the threshold based on the distance travelled by the vehicle over the duration.

19. A method for a vehicle system of a vehicle, comprising:
recursively predicting a state of degradation of a vehicle battery by updating a previously estimated state of degradation of the vehicle battery, the updating based on a sensed vehicle operating parameter from a vehicle sensor, a based on change in battery resistance and capacitance from initial values estimated at a time of installation in the vehicle system, over a duration of vehicle travel, and further based on a distance travelled by the vehicle over the duration, the battery resistance and capacitance derived from a sensed battery current or voltage; and
converting the predicted state of degradation into an estimate of time or duration remaining before the battery needs to be serviced for display of the estimate to a vehicle operator on a vehicle display, the converting based on each of past driving history data and predicted future driving.

20. The method of claim 19, wherein battery voltage or current sensed during transient vehicle operating conditions is weighted differently from battery voltage or current sensed during steady-state vehicle operating conditions.

* * * * *